United States Patent
Di Benedetto et al.

(10) Patent No.: US 9,112,812 B2
(45) Date of Patent: Aug. 18, 2015

(54) DISTRIBUTED VIRTUAL APPLIANCE

(75) Inventors: Marco Di Benedetto, Santa Clara, CA (US); Dante Malagrino, Palo Alto, CA (US); Alessandro Salvatori, San Jose, CA (US); Arthur Lihder Chang, Fremont, CA (US); Vijay Chander, San Ramon, CA (US); Thomas Vincent Flynn, Santa Clara, CA (US)

(73) Assignee: Embrane, Inc., Santa Clara, CA (US)

(*) Notice: Subject to any disclaimer, the term of this patent is extended or adjusted under 35 U.S.C. 154(b) by 613 days.

(21) Appl. No.: 13/240,020

(22) Filed: Sep. 22, 2011

(65) Prior Publication Data
US 2013/0080638 A1 Mar. 28, 2013

(51) Int. Cl.
G06F 15/173 (2006.01)
G06F 15/177 (2006.01)
H04L 12/911 (2013.01)
H04L 12/64 (2006.01)
H04L 12/713 (2013.01)

(52) U.S. Cl.
CPC ............ *H04L 47/70* (2013.01); *H04L 12/6418* (2013.01); *H04L 45/586* (2013.01)

(58) Field of Classification Search
USPC ....................................................... 709/224
See application file for complete search history.

(56) References Cited

U.S. PATENT DOCUMENTS

| | | | |
|---|---|---|---|
| 6,697,380 B1 | 2/2004 | Egbert et al. | |
| 6,922,782 B1 | 7/2005 | Spyker et al. | |
| 7,525,973 B1 | 4/2009 | McRae | |
| 2007/0245116 A1* | 10/2007 | Yamamoto et al. | 711/172 |
| 2008/0082977 A1 | 4/2008 | Araujo et al. | |
| 2008/0126852 A1 | 5/2008 | Brandyberry et al. | |
| 2010/0077395 A1 | 3/2010 | Edwards et al. | |
| 2010/0214949 A1 | 8/2010 | Smith et al. | |
| 2010/0223364 A1 | 9/2010 | Wei | |
| 2011/0004574 A1 | 1/2011 | Jeong et al. | |
| 2011/0078303 A1* | 3/2011 | Li et al. | 709/224 |
| 2011/0307889 A1* | 12/2011 | Moriki et al. | 718/1 |
| 2012/0054367 A1 | 3/2012 | Ramakrishnan et al. | |
| 2013/0054761 A1* | 2/2013 | Kempf et al. | 709/220 |
| 2014/0040343 A1* | 2/2014 | Nickolov et al. | 709/201 |

\* cited by examiner

*Primary Examiner* — Emmanuel L Moise
*Assistant Examiner* — Mahran Abu Roumi
(74) *Attorney, Agent, or Firm* — Van Pelt, Yi & James LLP

(57) ABSTRACT

A distributed virtual appliance is disclosed, including: allocating network traffic to a plurality of compute units implementing a network service associated with the distributed virtual appliance; and dynamically adding or removing one or more compute units implementing the network service without disruption to the network traffic.

31 Claims, 17 Drawing Sheets

| | Buckets | 1302 |
|---|---|---|
| Bucket a | Data plane ~~1~~ 6 | Flows C, L |
| Bucket b | Data plane 2 | Flows D, M |
| Bucket c | Data plane ~~3~~ 6 | Flows A, O |
| Bucket d | Data plane 5 | Flows B, K |
| Bucket e | Data plane 3 | Flow E, Q |
| Bucket f | Data plane 4 | Flow H, W |
| Bucket g | Data plane 1 | Flow I, N |
| Bucket h | Data plane 4 | Flow G, V |

|  | Current and Predecessor Data Planes | | |
|---|---|---|---|
|  | Current | 1st Predecessor | 2nd Predecessor |
| Bucket a | Data plane 6 | Data plane 1 | N/A |
| Bucket b | Data plane 2 | N/A | N/A |
| Bucket c | Data plane 6 | Data plane 3 | N/A |
| ⋮ |  |  |  |
| Bucket r | Data plane 1 | N/A | N/A |
FIG. 14A
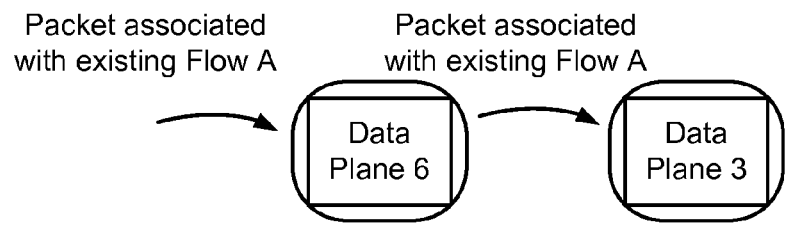
FIG. 14B
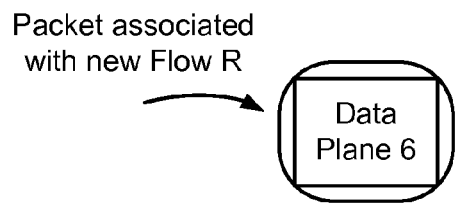
FIG. 14C

|  | Current and Predecessor Data Planes | | |
| --- | --- | --- | --- |
|  | Current | 1st Predecessor | 2nd Predecessor |
| Bucket a | Data plane 3 | Data plane 6 | N/A |
| Bucket b | Data plane 2 | N/A | N/A |
| Bucket c | Data plane 4 | N/A | N/A |
| Bucket d | Data plane 5 | N/A | N/A |
| Bucket e | Data plane 1 | Data plane 2 | N/A |

DISTRIBUTED VIRTUAL APPLIANCE

BACKGROUND OF THE INVENTION

The processing capacity of a typical network service (e.g., a firewall) is limited by the capacity of the physical hardware that is dedicated to supporting that service. For example, a network service cannot process more packets beyond the resources allotted by the physical hardware on which it is implemented. Furthermore, sometimes a network service uses less than all the capacity that is available from the physical hardware and so the unused processing capacity that is generally dedicated to this service is wasted.

BRIEF DESCRIPTION OF THE DRAWINGS

Various embodiments of the invention are disclosed in the following detailed description and the accompanying drawings.

FIGS. 14A, 14B, and 14C illustrate examples of updating a history table in association with the addition of a new data plane compute unit to a DVA and the reallocation of network traffic in the DVA in accordance with some embodiments.

DETAILED DESCRIPTION

Figure 1:
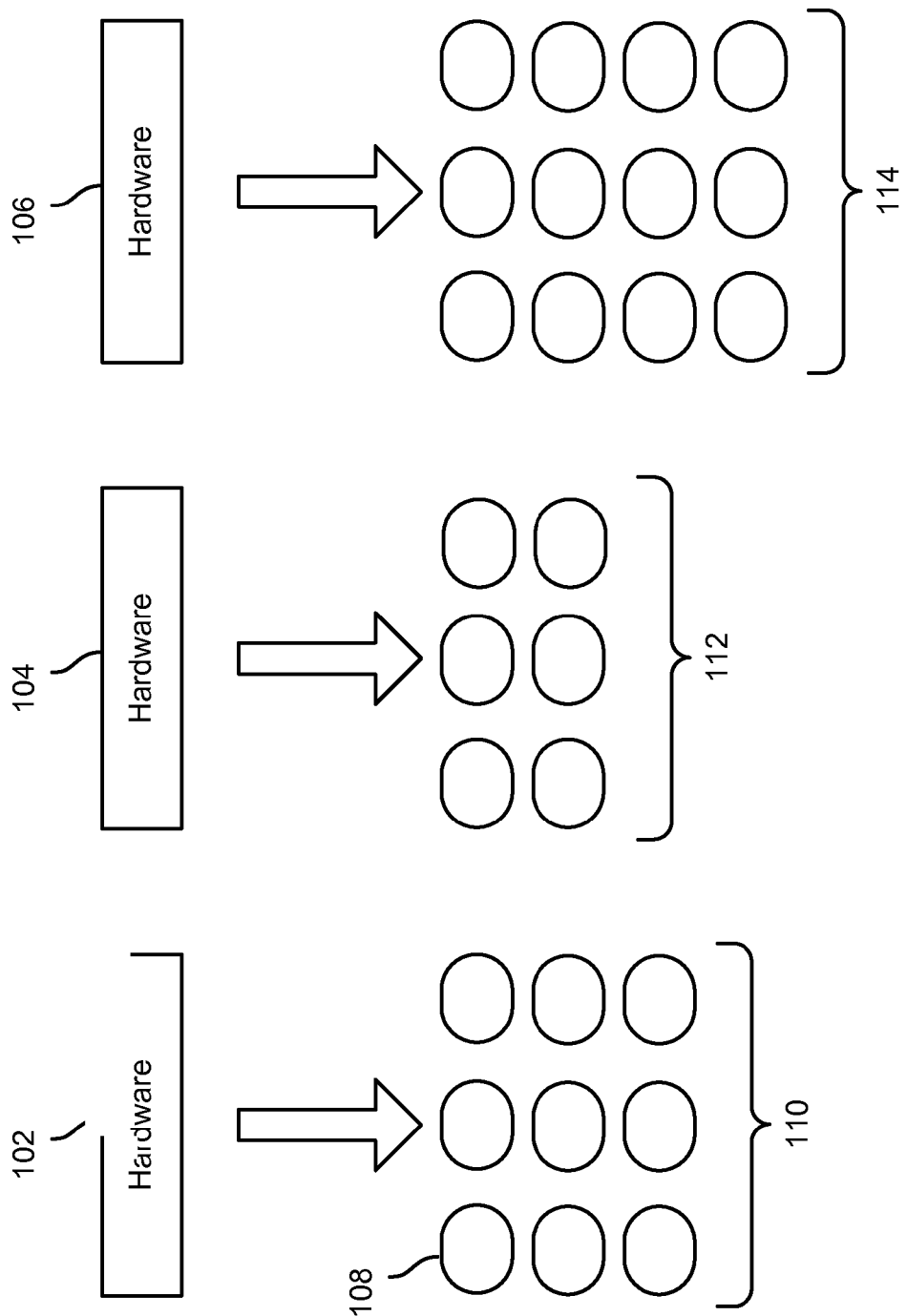
FIG. 1 shows an example of provisioning hardware into virtualized resources in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques for providing a distributed virtual appliance are disclosed. In various embodiments, the distributed virtual appliance (sometimes referred to herein as a DVA) is configured to perform at least one network service. The distributed virtual appliance includes multiple compute units. Each compute unit is implemented from a virtual resource (e.g., a virtual machine) and is configured to perform a certain role. The compute units that comprise a distributed virtual appliance work in concert to perform the functions associated with the network service of that distributed virtual appliance. For example, the compute units work together to ensure a consistent allocation of network traffic across the compute units associated with the distributed virtual appliance. In some embodiments, compute units implementing the network service are dynamically added or removed without disruption to the network traffic. It would be helpful to allow a network service to have processing capacity that is dynamically allocated (in contrast to a conventional system for a network service that has a fixed allocation of resources).

In various embodiments, an elastic services manager (sometimes referred to herein as ESM) manages the provisioning of physical and/or virtual resources for one or more distributed virtual appliances. In some embodiments, the elastic services manager receives a set of policies that is used to create a layout for a distributed virtual appliance. The layout of a distributed virtual appliance can include, for example, the number of compute units to be used to implement the appliance and/or the respective roles of the compute units. In various embodiments, the elastic services manager dynamically distributes virtualized resources (i.e., compute units) to the one or more distributed virtual appliances.

FIG. 1 shows an example of provisioning hardware into virtualized resources in accordance with some embodiments. Hardware units 102, 104, and 106 are each provisioned into multiple virtualized resources, such as virtualized resource 108. An example of a hardware unit 102, 104, or 106 is a server that uses an x86 processor. In the example, each of hardware units 102, 104, and 106 is provisioned into a set of virtualized resources; hardware unit 102 is provisioned into set of virtualized resources 110; hardware unit 104 is provisioned into set of virtualized resources 112, and hardware unit 106 is provisioned into set of virtualized resources 114. As shown in the example, sets of virtualized resources 110, 112, and 114 vary in number of virtualized resources, depending on the capacities (e.g., available disk space, memory, processor speed) of the respective hardware unit from which each set was provisioned.

In various embodiments, a hardware virtualization tool (e.g., a hypervisor) is used to provision each unit of hardware into one or more virtualized resources. An example of a hypervisor is VMware ESXi. In various embodiments, a virtualized resource is a virtual machine (sometimes referred to herein as a VM). A VM is a software implementation of a physical machine that executes programs like a physical machine. Each VM may run a different operating system. So different operating systems may concurrently run and share the resources of the same unit of physical hardware.

In various embodiments, a virtualized resource is used to implement one compute unit. In some embodiments, each VM is used to implement one compute unit. As used herein, a compute unit is the minimal amount of virtualized resources that can be used to perform some sort of function of processing data. In various embodiments, each compute unit maps to one processing core. In some embodiments, each compute unit maps to more than one processing core. In some embodiments, each compute unit maps to less than one processing core (i.e., multiple compute units share the same processing core). Due to possible differences in hardware and/or techniques of hardware provisioning, different compute units (i.e., different VMs) can be associated with different capacities of processing power.

Figure 2:
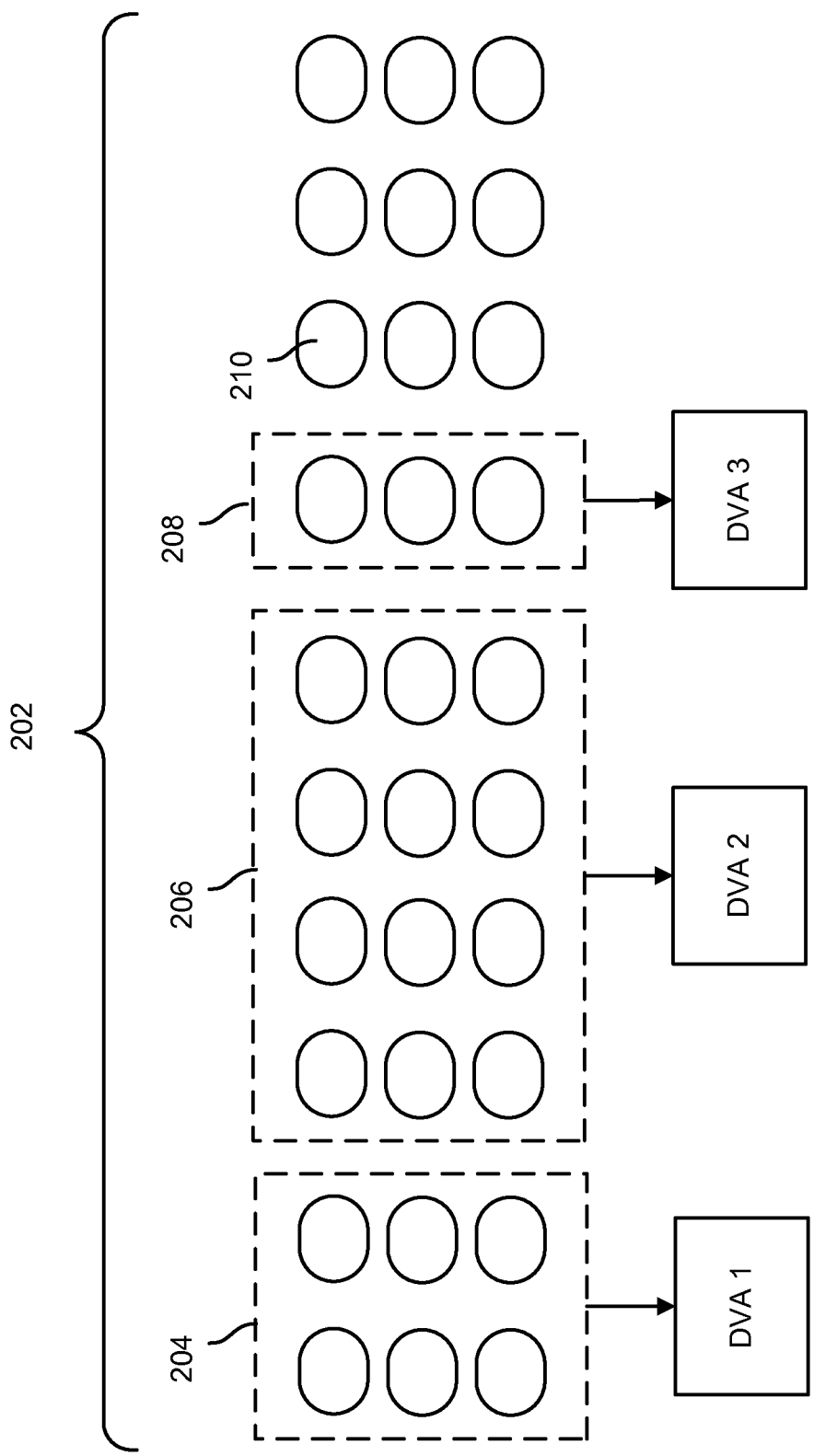
FIG. 2 is an example of allocating compute units to multiple distributed virtual appliances in accordance with some embodiments.

FIG. 2 is an example of allocating compute units to multiple distributed virtual appliances in accordance with some embodiments. As shown in the example, 202 represents a pool of available compute units (such as compute unit 210). In some embodiments, pool of available compute units 202 is managed by a management tool, the elastic services manager (ESM), which also manages the resources provisioned for DVAs (DVA 1, DVA 2, and DVA 3). In some embodiments, the pool of available compute units (e.g., VMs) of the example have already been provisioned from one or more units of hardware prior to the ESM coming into management of them. In some embodiments, one or more available compute units are provisioned directly by the ESM from one or more units of hardware as more virtual resources are needed over time (e.g., by one or more DVAs). Further details regarding the ESM will be discussed below. A subset of the pool of available compute units 202 is allocated (e.g., by the ESM) to each DVA. For example, one or more compute units can be allocated to a DVA when the DVA is being set up to start performing a network service or dynamically added when the DVA requires more processing capacity. In the example, set of compute units 204 (which includes 6 compute units) is allocated to DVA 1, set of compute units 206 is allocated to DVA 2, and set of compute units 208 is allocated to DVA 3. The compute units that are unallocated (in the example, these compute units are those not shown to be enclosed within a dotted-line box) can be dynamically allocated to one or more DVAs when the DVAs require more processing capacity. Also, one or more compute units that are currently allocated to a DVA can be dynamically removed from that DVA. For example, one or more compute units can be removed from a DVA if it is determined that the DVA can process a desired amount of traffic with fewer than all the compute units allocated to it or if it is determined that compute units need to be added to another DVA (e.g., one with greater priority) that needs more compute units.

In various embodiments, a DVA is configured to perform at least one network service. In some embodiments, the DVA is configured to perform at least one network service assigned by an ESM and/or specified by a set of configuration information. In some embodiments, the service could be associated with network layers 2 and 3. For example, a service that is associated with network layers 2 and/or 3 includes, but is not limited to, one or more of the following: routing, switching, Fibre Channel over Ethernet (FCoE), and traffic engineering. In some embodiments, the service could be associated with network layers 4 and/or 7. For example, a service that is associated with network layers 4 and/or 7 includes, but is not limited to, one or more of the following: load balancing, firewall, secure sockets layer (SSL), hypertext transfer protocol (HTTP) acceleration, intrusion detection, and wide area network (WAN) optimization.

In various embodiments, the compute units of the set that is allocated to a particular DVA are configured to coordinate among themselves to perform the functions (e.g., of one or more network services) associated with the DVA. Put another way, a DVA is a logical container that includes the set of the compute units allocated to it and the compute units of the set work in concert to provide the functions of the network service associated with the DVA. In various embodiments, the set of compute units allocated to a DVA maintain consistent allocation of network traffic to those of the compute units at which, for example, the traffic is to terminate. In some embodiments, each compute unit included in a set of compute units allocated to a DVA can be associated with an identifier associated with that DVA. In various embodiments, generally, the more compute units that are allocated to a DVA, the more processing capacity the DVA has. Conversely, generally, the fewer compute units that are allocated to a DVA, the less processing capacity the DVA has. For a DVA, compute units can be dynamically (e.g., elastically) added when the DVA requires more processing capacity and also dynamically removed when the DVA requires less processing capacity, without disrupting the traffic to the DVA. Furthermore, the availability of unallocated compute units can also be increased by dynamically provisioning more hardware to create more VMs that can be implemented as compute units. In contrast to a conventional network services system that provides a fixed amount of resources dedicated to performing one function, the DVA system permits the elastic increase and decrease of resources to better reflect the varying amount of data processing that is actually needed for a network service.

In various embodiments, each compute unit that is allocated to a particular DVA is configured to assume a certain role (e.g., a data plane, a data planes dispatcher, or a data planes manager), which is explained below.

Figure 3:
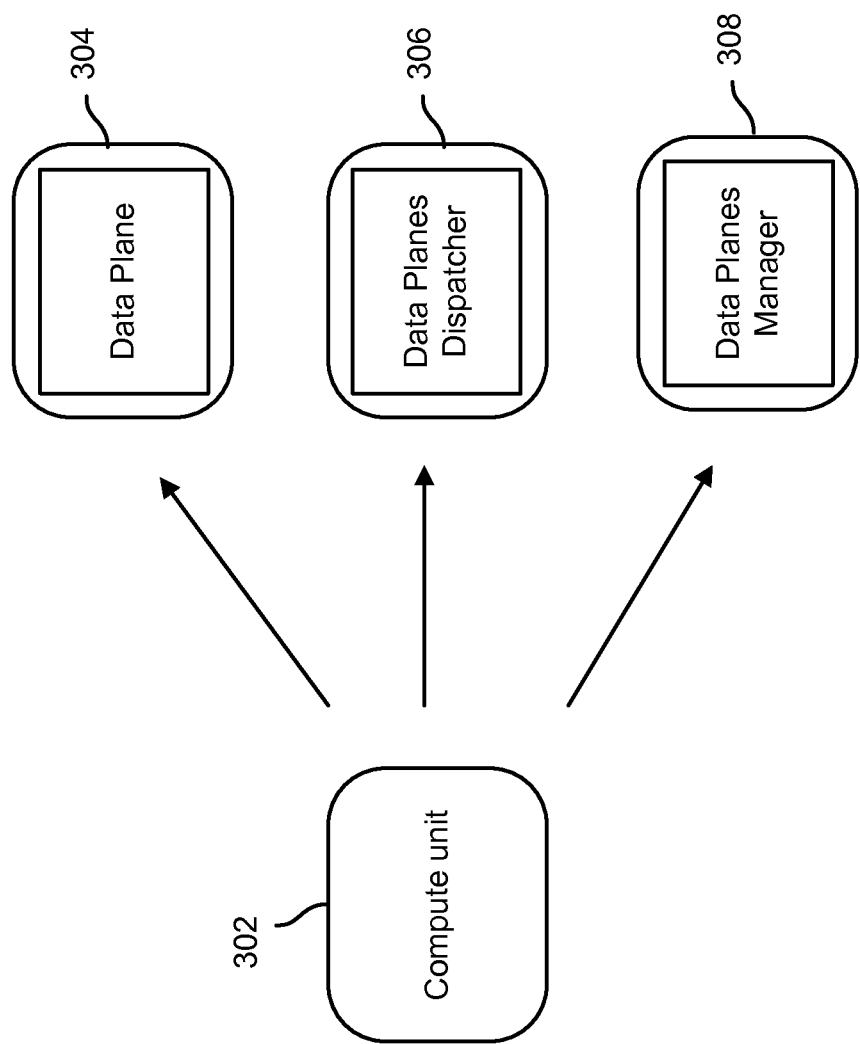
FIG. 3 shows an example of three roles that a compute unit can be configured to assume in accordance with some embodiments.

FIG. 3 shows an example of three roles that a compute unit can be configured to assume in accordance with some embodiments. In some embodiments, a compute unit, such as compute unit 302, can be configured to assume one of the following roles: 1) data plane 304, 2) data planes dispatcher 306, or 3) data planes manager 308. In some embodiments, a compute unit is configured to assume a role each time it is allocated to a DVA. Put another way, for example, the same compute unit can be configured to assume one role, e.g., a data plane, when it is allocated to a first DVA. And subsequently, after the compute unit has been removed from the first DVA, it can be destroyed and its computational resources can be used to form a new compute unit that is configured to assume another role, e.g., a data planes dispatcher, or the same role when the resources are allocated to a second DVA. In some embodiments, a compute unit can be configured to assume more than one role. For the examples of the present application, it is assumed that each compute unit is configured to assume only one role, even though in implementation, a compute unit can take on more than one role.

A data plane compute unit (or sometimes referred to herein as simply data plane) is configured to perform the actual processing of data based on the function (e.g., load balancing, maintaining a firewall, intrusion detecting) of the network service of the DVA with which the data plane compute unit is associated. In some embodiments, a DVA includes multiple data plane compute units. In various embodiments, generally, when a DVA requires more processing capacity, compute units are allocated to the DVA (e.g., by an ESM) and configured to be data plane compute units. In some embodiments, when it is detected (e.g., by an ESM) that a DVA requires or will require more processing capacity (e.g., to better handle a current workload or a future increase in workload), one or more compute units configured as data plane compute units can be automatically allocated (e.g., by the ESM) to the DVA to increase its processing capacity. In some embodiments, when it is detected (e.g., by an ESM) that a DVA could manage the current workload with less than its current processing capacity, one or more data plane compute units can be automatically removed (e.g., by the ESM) from the DVA to decrease its processing capacity.

In various embodiments, all data plane compute units associated with the same DVA perform similar tasks that are related to the network service(s) of the DVA. For example, if the network service associated with a DVA is a firewall, then all the data plane compute units associated with that DVA perform data processing related to the functions (e.g., comparing received packets to a set of configured rules, discarding packets, permitting certain packets to pass through) of a firewall. However, not all the data plane compute units associated with the same DVA necessarily have the same processing capacity. As mentioned above, the processing capacity of a compute unit is based on the properties of the hardware from which it was virtualized. Due to the varying processing capacities of the data plane compute units associated with the DVA, each data plane compute unit could process a different capacity of the overall workload associated with the DVA. In some embodiments, the processing capacity of a compute unit depends on a few factors. For example, the capacity of a compute unit depends both on the hardware that is chosen for it to run on and the proportion of resources of that hardware that is allocated to the compute unit. In some embodiments, an ESM can configure a processing capacity associated with a compute unit at the time of provisioning the compute unit, but an associated hypervisor may make continuous adjustments to the actual capacity at runtime. Therefore, in various embodiments, the DVA to which a compute unit is allocated continuously monitors the performance of a compute unit at runtime to detect the actual processing capacity of that compute unit (e.g., and can adjust the distribution of the network traffic to the compute units based on such monitoring). For example, if five data plane compute units were allocated to a DVA, the total processing capacity of the DVA could be divided as 15%, 30%, 35%, 10% and 10%, respectively, for each of the five data plane compute units at a certain point in time.

In various embodiments, the data plane compute units associated with a DVA work in concert, and also with one or more data planes dispatcher compute units associated with the same DVA, to maintain a non-disruptive flow of network data and to minimize the need to synchronize state information. In various embodiments, the flow of network data is maintained regardless of whether the network data originates from or terminates at the DVA or crosses through the DVA. For example, when network data originates from or terminates at the DVA, that is the case of a DVA that performs the functions associated with a proxy network service. Also, for example, when network data crosses at the DVA, that is the case of a DVA that performs the functions associated with a transparent (i.e., non-proxy) network service. In various embodiments, maintaining a non-disruptive flow of network data includes maintaining a consistent allocation of traffic to the data plane compute units associated with the DVA. For example, packets (e.g., Transmission Control Protocol "TCP" or User Datagram Protocol "UDP") associated with a particular flow of network traffic (e.g., as identified by a subset of the information included in a packet header) are always mapped (e.g., by a data planes dispatcher) to the same data plane compute unit. Furthermore, the consistent allocation of traffic is accomplished without the need for a data planes dispatcher compute unit to store information with respect to how network data associated with a certain network traffic flow maps to a certain data plane compute unit (e.g., all packets associated with network traffic flow A should be dispatched to data plane compute unit 3). Instead of requiring the data planes dispatcher compute units to store such mapping information (e.g., which network traffic flow should be mapped to which data plane compute unit), the data planes dispatcher uses hashing or mapping techniques to ensure that a flow of network traffic is always correctly allocated either to the data plane compute unit that already manages that flow or to a data plane compute unit that is available to manage a new flow.

In some embodiments, the data plane compute units do not store state information in persistent storage. An advantage in a data plane compute unit's lack of use of persistent storage is that no confidential data on the compute unit can remain after it has been powered off. Such a characteristic could improve security, such as in the transition of "ownership" of the data plane compute unit from one owner to another owner (when confidential data needs to be removed from the compute unit as a part of this transition).

In some embodiments, upon layout transitions (e.g., in the process of either adding or removing a data plane compute unit to/from a DVA), a flow of network traffic is passed from one data plane compute unit to another data plane compute unit. In this event, a data plane compute unit stores history information (such as a history table that includes information regarding predecessor data planes that manage a flow of network traffic that has been distributed to that data plane compute unit) (e.g., in memory). In some embodiments, a data plane compute unit determines which flows of network traffic belong to (e.g., are managed by) it or another data plane compute unit, and, if appropriate, punts network flows managed by another data plane compute unit back to that other data plane compute unit.

A data planes dispatcher compute unit is configured to communicate with entities outside of the DVA logical container. Examples of such outside entities include any entity that either sends network data to the DVA (e.g., a router) or any entity that receives network data that is sent from the DVA. As seen by outside entities, the data planes dispatcher is the termination point for network traffic that enters the DVA. In various embodiments, a DVA includes at least one data planes dispatcher compute unit. In various embodiments, a data planes dispatcher compute unit manages network traffic flows to and from the data plane compute units of the DVA. In the event that there are multiple data planes dispatcher compute units allocated to a particular DVA, each data planes dispatcher compute unit is configured to dispatch traffic to a subset of the data plane compute units associated with that DVA (the subsets of data plane compute units to which different data planes dispatcher compute units distribute network traffic can include at least some overlap).

In various embodiments, the one or more data planes dispatcher compute units associated with a particular DVA are configured to maintain a consistent allocation of network (e.g., packets) traffic/flows among the data plane compute units associated with that DVA. In various embodiments, the one or more data planes dispatcher compute units associated with a particular DVA are configured to consistently maintain network traffic flows for the DVA regardless of whether the DVA is initiating communication (e.g., if the DVA were implemented as part of a client device) or receiving an initiation of communication (e.g., if the DVA were implemented as part of a server device) or permitting network traffic to pass or cross through (e.g., if the DVA were implemented as a transparent network service).

In some embodiments, the one or more data planes dispatcher compute units are configured to consistently maintain network traffic flows to the data plane compute units by using consistent hashing and permitting the data plane compute units to punt traffic flows among themselves. For example, a data planes dispatcher compute unit is configured to distribute traffic flows in the same way regardless of whether the flow is a new (i.e., the flow is not already managed by any data plane compute unit of the DVA) or if the flow is an existing flow (i.e., the flow is not "new" and is already managed by one data plane compute unit). In other words, a data planes dispatcher compute unit doesn't need to track flow state, and will let the data plane compute units track flow states and punt traffic among themselves based on that state. When the DVA system is in a steady or stable state (i.e., each flow is managed by one data plane compute unit and has no predecessor data plane compute unit; this case occurs when there are no data plane compute units being added or removed from the DVA), the data planes dispatcher compute unit distributes the packet to the responsible data plane compute unit, which keeps the packet and processes it. When the DVA system is not in a steady or stable state (i.e., at least one flow which is hashed/mapped to one data plane compute unit was once hashed/mapped to another data plane compute unit of the DVA), the data planes dispatcher compute unit distributes the packet to the presently assigned data plane compute unit, which then refers to the history table to determine that another data plane compute unit has previously managed the flow and proceeds to punt the packet to the other data plane compute unit. For example, a data planes dispatcher compute unit is configured to consistently distribute packets associated with a certain existing (i.e., not "new") network traffic flow (e.g., flow A) to a certain data plane compute unit (e.g., data plane compute unit 3) by using one or more hashing/mapping techniques. Assume that in this example, prior to being distributed directly to data plane compute unit 3, flow A was previously managed by data plane compute unit 1 (e.g., because data plane compute unit 3 was added to the DVA subsequent to the addition of data plane compute unit 1). After the data planes dispatcher compute unit dispatches a packet associated with flow A to data plane compute unit 3, data plane compute unit 3 can refer to a history table to determine whether a predecessor data plane compute unit exists for flow A. Upon determining that flow A was previously managed by data plane compute unit 1, data plane compute unit 3 will punt the packet to data plane compute unit 1. More examples regarding consistent hashing and flow punting will be described below.

In some embodiments, the one or more data planes dispatcher compute units of a DVA are configured to communicate with each other such that one data planes dispatcher compute unit has an awareness of how another data planes dispatcher compute unit is assigning network traffic to the data plane compute units managed by this other data planes dispatcher compute unit. For example, when the DVA is configured to permit network traffic to cross through (e.g., when bidirectional traffic flows between a server and a client), the traffic will arrive at the DVA through two interfaces. Assume that in this example, there are two data planes dispatcher compute units, data planes dispatcher A and data planes dispatcher B. Assume in this example that data planes dispatcher A serves as the ingress for the traffic flows in one direction (e.g., from the client to the server) and data planes dispatcher B serves as the ingress for the traffic flows in the opposite direction (e.g., from the server to the client). In this case, data planes dispatcher A and data planes dispatcher B would need to coordinate with each other so that traffic flows in both directions are dispatched to the same data plane compute unit(s) for proper processing.

In various embodiments, an outside entity (e.g., a router) passes a network packet destined for the DVA to one of the data planes dispatchers associated with the DVA. The data planes dispatcher that receives the network packet uses a set of policies (e.g., a hashing or some form of mapping technique) to allocate the network packet to an appropriate data plane compute unit. Put another way, in various embodiments, the data planes dispatcher is a policy-based assignor of network packets that enter the DVA. For example, the data planes dispatcher compute unit can perform at least one hash on information extracted from the header of a TCP or UDP network packet to determine to which data plane compute unit the network packet is to be allocated. In various embodiments, packets associated with a particular network traffic flow are always mapped to the same data plane compute unit (if not directly, then indirectly by virtue of the receiving data plane compute unit(s) passing the packet to the responsible data plane compute unit). Because the data planes dispatcher compute unit uses a set of policies to consistently allocate packets associated with network traffic flows, the data plane compute units need only to minimally maintain state information associated with the network traffic flows that are processed by it (e.g., a data plane compute unit can keep track of the TCP packet sequence numbers associated with the flows that it manages). Synchronization of state information (e.g., among multiple data plane compute units) can be computationally expensive because, for example, for each TCP packet that is received by a data plane compute unit, the state information regarding the flow with which the packet is associated needs to be updated (e.g., to reflect the sequence number associated with the recently received packet). Since each act of receiving a packet by a data plane compute unit changes state information, the storage of state information needs to be multiplied by the number of data plane compute units associated with the DVA. In contrast to a system that requires the synchronization of state information, a DVA system that uses policy-based data planes dispatcher(s) requires only the storage of policies which the data planes dispatcher compute units use to assign/distribute network traffic, a comparatively lightweight solution.

In some embodiments, the allocation of network traffic by a data planes dispatcher compute unit to each data plane compute unit can change dynamically over time as a function of the processing capacity that is available on each data plane compute unit. Put another way, the amount of network traffic that a data planes dispatcher compute unit sends to a data plane compute unit can be variable over time. For example, a data planes dispatcher compute unit is not necessarily sending the same amount of traffic to each data plane compute unit, since different data plane compute units may have different amounts of processing power (e.g., based on the properties of the hardware from which each VM was provisioned). Instead, in some embodiments, a data planes dispatcher compute unit can send network traffic to the data plane compute units such that each data plane compute unit is similarly busy, relative to each data plane compute unit's respective processing capacity. For example, the data planes dispatcher compute unit can send network traffic to each data plane compute unit such that each data plane compute unit is operating at 30% of its CPU utilization.

In some embodiments, a data planes dispatcher compute unit can redistribute the amount of traffic passed to each data plane compute unit based on a periodic feedback (e.g., received from a monitoring data planes manager compute unit) of whether the current distribution of traffic needs to be changed. For example, if it is determined that one data plane compute unit is processing a comparatively high amount of network traffic that enters the DVA, then a data planes dispatcher can redistribute the traffic such that the data plane compute unit will receive fewer new flows in the future.

A data planes manager compute unit is configured to manage the other types of compute units (i.e., data planes, data planes dispatchers), and access persistent storage associated with a DVA logical container. In some embodiments, a DVA includes at least one data planes manager compute unit (e.g., more than one data planes managers could be needed in a DVA for redundancy or if there are too many data planes and data planes dispatchers to manage). In various embodiments, a data planes manager compute unit is configured to receive a set of DVA configuration information from a management tool at the DVA management interface in the form of (e.g., RESTful) APIs. For example, the DVA configuration information can be stored in a persistent storage (e.g., so that each time the DVA is turned on/instantiated, its associated configuration information can be recalled and retrieved from the persistent storage). The DVA configuration information can include, for example, one or more of: a network service that the DVA is to perform and configurations associated with the network service being implemented at the DVA (e.g., for a firewall network service, the configuration could include access control lists (ACLs) that define how packets are filtered, for a load balancer DVA, the configuration could include virtual IP information, backend servers information and load balancing methods among those backend servers for the VIP), and one or more other properties of the DVA. In some embodiments, the DVA configuration information is stored on persistent storage associated with the DVA In some embodiments, the set of ESM policies for the DVA layout is stored at a persistent storage associated with the ESM (e.g., which is accessible to the ESM but not the DVA). In some embodiments, a set of ESM policies for the DVA layout can include, for example, one or more of: a condition (e.g., meeting a threshold) of when another compute unit is to be added, a condition (e.g., falling below a threshold) of when a compute unit is to be removed, bandwidth properties, throughput properties, latency properties, reliability characteristics properties, the number of data plane compute units to be allocated for the DVA, the number of data planes dispatcher compute units to manage (e.g., and which of) the allocated data plane compute units, which internal internet protocol (IP) addresses (e.g., in-band IP addresses and out-of-band IP addresses) are to be assigned to all the compute units, and any other appropriate information. In some embodiments, the set of ESM policies is used only by the ESM and not passed on to the DVA; the ESM uses such a set of policies to determine the layout of the DVA (e.g., how many data plane compute units/data planes dispatcher compute units/data planes manager compute units to allocate to it) while the DVA just uses its allocation of compute units that have been allocated to it by the ESM. In some embodiments, when a compute unit is allocated to a DVA, its role within the DVA has already been determined (e.g., by the ESM).

Figure 4:
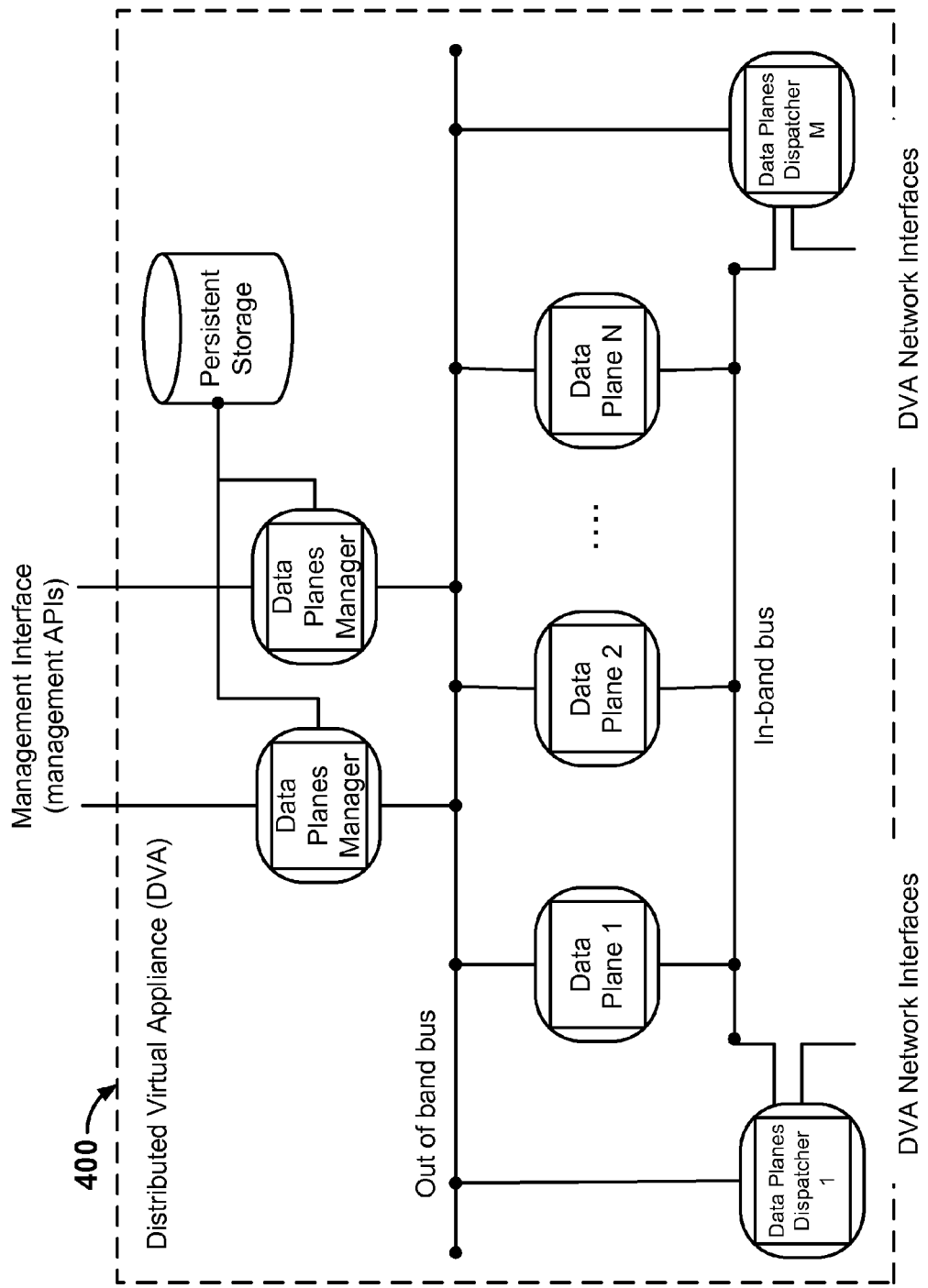
FIG. 4 is an example of the system of a distributed virtual appliance (DVA) in accordance with some embodiments.

FIG. 4 is an example of the system of a distributed virtual appliance (DVA) in accordance with some embodiments. In the example, DVA 400 includes data plane compute units 1 through N, data planes dispatcher compute units 1 through M, two data planes managers and a persistent storage. In some embodiments, the layout of DVA 400 was determined by a set of ESM policies that determined the N number of data plane compute units, M number of data planes dispatcher compute units, and the two data planes managers, among other layout related properties, that DVA 400 was to have. DVA 400 communicates with a management tool through the data planes manager compute units. In some embodiments, the data planes manager compute units use one or more application programming interfaces (APIs) to communicate back and forth with the management tool. DVA 400 can be configured (e.g., based on DVA configuration information received from the management APIs and stored at the persistent storage) to perform, for example, any one or more of the following network services: routing, switching, Fibre Channel over Ethernet (FCoE), traffic engineering, load balancing, firewall, secure sockets layer (SSL), hypertext transfer protocol (HTTP) acceleration, intrusion detection, and wide area network (WAN) optimization. In the example, the data planes manager compute units are linked to each other, data planes 1 through N, and data planes dispatchers 1 through M, via an out-of-band bus. In the example, data plane compute units 1 through N are linked to each other, and to data planes dispatchers 1 through M via an in-band bus. In various embodiments, the out-of-band and in-band bus are logical buses (as opposed to physical buses) that use (e.g., internal IP) protocols and messaging techniques that are specially designed to be used with the DVA system. In various embodiments, a data planes dispatcher compute unit distributes a network packet that it receives via the DVA network interfaces (e.g., from a router) to an appropriate data plane compute unit over the in-band bus. In some embodiments, a data planes dispatcher compute unit uses a tunneling technology to transfer a network packet that it receives via the DVA network interfaces to a data plane compute unit over the in-band bus. Tunneling enables the headers (including the L2 headers) of the network packets to be preserved and also supports any form of physical network that could separate a data planes dispatcher compute unit with a data plane compute unit. For example, the data planes dispatchers compute unit and one or more data plane compute units can have layer 2 adjacency on the in-band (the compute units are in the same subnet), or they can have layer 3 adjacency (the compute units are in different subnets that are separated by routers). In some embodiments, the tunneling technique used in the DVA system is a form of MAC-in-IP tunneling that is enhanced to support punting features.

Figure 5:
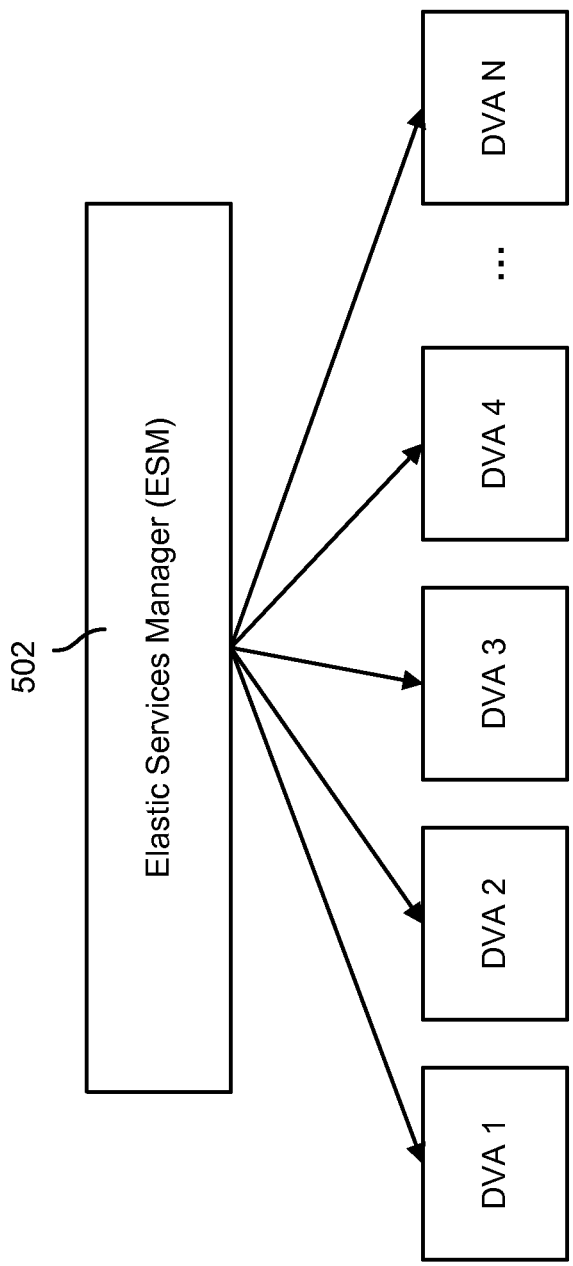
FIG. 5 shows an example of an elastic services manager (ESM) and the distributed virtual appliances for which it manages resources in accordance with some embodiments.

FIG. 5 shows an example of an elastic services manager (ESM) and the distributed virtual appliances for which it manages resources in accordance with some embodiments. In various embodiments, the ESM is a policy-based engine for physical and virtualized resource management for one or more DVAs. In various embodiments, the ESM is configured to allocate compute units to DVAs and also dynamically add or remove compute units to the DVAs as more or less are needed. The ESM can be implemented using one or both of software and hardware. In the example, ESM 502 manages physical and virtualized resources for DVA 1 through N. In some embodiments, each of DVA 1 through N can be implemented using the example architecture of DVA 400 of FIG. 4 (e.g., with a set of ESM policies for a DVA layout). Each of DVA 1 through N can be configured to perform a network service. In some embodiments, a user can assign a certain amount of hardware to the ESM and the ESM can communicate with a hardware virtualization tool (typically, a hypervisor is used) to provision that hardware into virtualized resources (e.g., VMs) that can be used to implement compute units.

In various embodiments, the ESM allocates and manages resources for a set of DVAs. In some embodiments, a set of ESM policies for a DVA layout can include, for example, the network service that the DVA is to perform (e.g., the exact software image that will run on the DVA), a condition (e.g., meeting a threshold) of when another compute unit is to be added, a condition (e.g., falling below a threshold) of when a compute unit is to be removed, bandwidth properties, throughput properties, latency properties, reliability characteristics properties, and the number of data plane compute units to be allocated for the DVA. In some embodiments, the ESM can receive a set of policies for DVA layout via a user interface (e.g., at which a user, such as a system administrator, can input information). In some embodiments, the ESM can receive policies for DVA layout via one or more APIs (e.g., RESTful APIs).

Subsequent to receiving a set of policies for a DVA layout, the ESM can store the set of policies for a DVA layout and create/instantiate the DVA based on the set of policies for the DVA layout when appropriate (e.g., at a time or in response to an event specified by the set of policies). To create a DVA, in some embodiments, the ESM allocates the number of compute units (e.g., after provisioning these compute units upon the need to create a DVA) needed (e.g., based on the set of policies for the DVA layout) to form that DVA. The ESM also configures each compute unit allocated to the DVA to assume a particular role (e.g., at least one of a data plane, data planes dispatcher or data planes manager) as part of the DVA. For example, the ESM could turn over one or more data plane compute units to the data planes manager compute units of the DVA for the data planes manager compute units to manage. In some embodiments, the ESM assigns a software image associated with the network service of the DVA for the set of compute units allocated to the DVA to run. For example, a data planes manager associated with the DVA can run the software image assigned by the ESM and also boot all the data planes and data planes dispatchers of the DVA to run that software image. In some embodiments, the ESM downloads a set of DVA configuration information to a persistent form of storage (e.g., a hard disk) that is associated with the DVA so that if/when the DVA is restarted or instantiated, the configuration information can be retrieved from storage and used to configure the properties (e.g., throughput) and functions (e.g., associated with particular network service(s)) of the DVA.

In various embodiments, the ESM monitors the usage (e.g., the percent of the utilization) of data plane compute units at each DVA. For example, the ESM can monitor the data plane compute units of a DVA by querying and/or communicating via APIs with the data planes manager compute units of the DVA. In some embodiments, this usage is presented to a user (e.g., at a user interface). In some embodiments, either by a user selection (e.g., at a user interface) or via automatic detection (e.g., the usage of the data plane compute units reaches a threshold that is defined in the set of ESM policies for the DVA layout), the ESM can dynamically allocate one or more compute units to the DVA (to be implemented as data plane compute units to increase the processing capacity of the DVA). In some embodiments, either by a user selection (e.g., at a user interface) or via automatic detection (e.g., the usage of the data plane compute units falls below a threshold that is defined in the set of ESM policies for the DVA layout), the ESM can dynamically remove one or more compute units allocated to the DVA (to reduce the processing capacity of the DVA when the DVA can perform the required workload with fewer than the currently allocated compute units).

For example, a user can choose to create a DVA that performs the network service of load balancing with five data plane compute units, one data planes dispatcher compute unit, and one data planes manager compute unit. The ESM will create seven compute units out of the unused hardware resources to create all the compute units for the load balancer and then associate a load balancing software image with the chosen seven compute units to create the load balancer network service. Later, the user might see (e.g., at a user interface of the ESM) that the load balancer needs more capacity and so can request the ESM to add two more compute units (e.g., to be used as data plane compute units) to that load balancing network service. The ESM will create another two compute units out of the available hardware and allocate them to the load balancer associated with the user's request. Or, the user might see that the load balancer is not using its full capacity and so can also request ESM to remove some compute units (e.g., to be added to another DVA that is in need of more resources).

Figure 6:
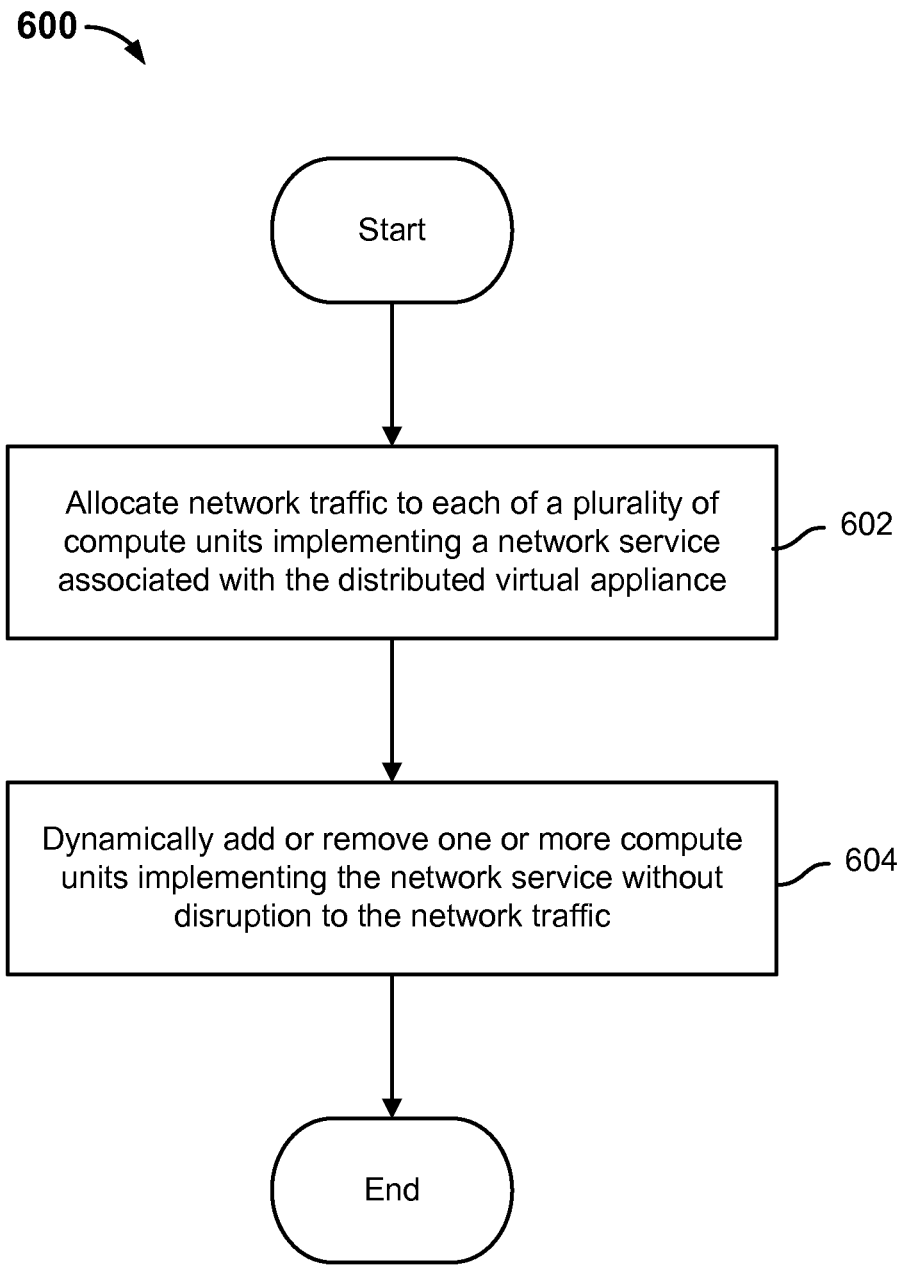
FIG. 6 is a flow diagram showing an embodiment of a process of implementing a distributed virtual appliance in accordance with some embodiments.

FIG. 6 is a flow diagram showing an embodiment of a process of implementing a distributed virtual appliance in accordance with some embodiments. In some embodiments, process 600 can be implemented at least in part on system 400.

At 602, network traffic is allocated to each of a plurality of compute units implementing the network service associated with the distributed virtual appliance. For example, a DVA can be created (e.g., by an ESM) to perform a particular network service such as a firewall. The created DVA includes a set of, for example, four data plane compute units, one data planes dispatcher compute unit, and one data planes manager compute unit. In some embodiments, a compute unit is implemented using a VM. The data planes manager compute unit can implement at least some of the properties of the DVA based on a set of configuration information associated with the DVA. Network traffic that enters the DVA is allocated by the data planes dispatcher compute unit to the four data plane compute units such that a data plane compute unit always receives network packets associated with network traffic flows for which that data plane compute unit is responsible. The recipient data plane compute unit processes the received network packet in a manner that is associated with the functions of the firewall network service.

At 604, one or more compute units implementing the network service are dynamically added or removed without disruption to the network traffic. Returning to the previous example, if the firewall network service requires more processing capacity (e.g., as indicated by a high usage of the existing data plane compute units), then one or more compute units can be dynamically added to the DVA (e.g., by the ESM). For example, the additional data plane compute units can be phased in to manage new network traffic flows such that existing network traffic flows will not be dropped by the newly added data plane compute units and instead, the existing flows will be passed to the responsible data plane compute units that existed prior to the addition of the new data plane compute units. Similarly, if the firewall network service requires less processing capacity (e.g., as indicated by a low usage of the existing data plane compute units), then one or more compute units can be dynamically removed from the DVA (e.g., by the ESM). For example, the compute units can be removed in such a way that network traffic flows associated with the data plane compute units that are to be removed are processed by the responsible data plane compute units until they are drained (e.g., the flows are terminated) before the data plane compute units are removed.

Figure 7:
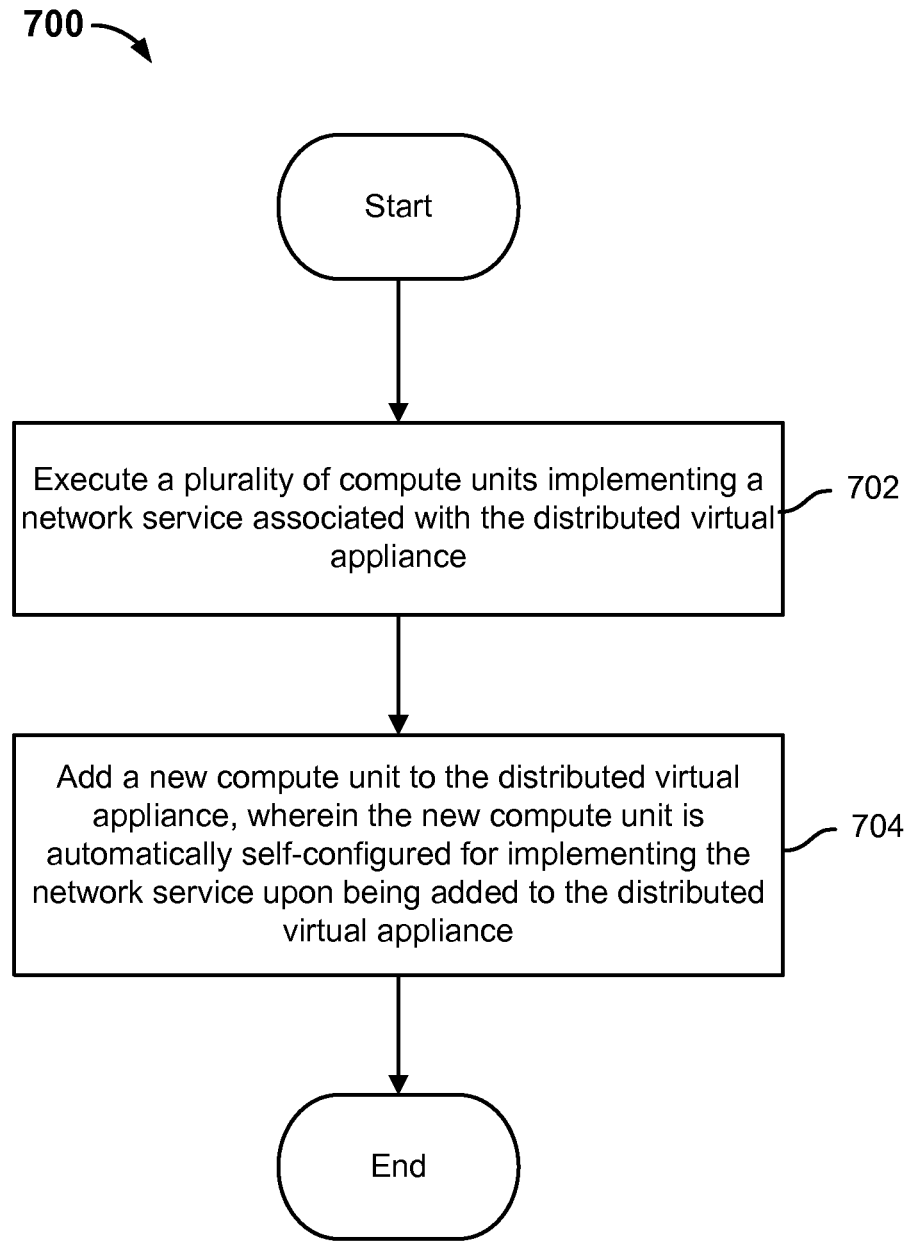
FIG. 7 is a flow diagram showing an embodiment of a process of implementing a distributed virtual appliance in accordance with some embodiments.

FIG. 7 is a flow diagram showing an embodiment of a process of implementing a distributed virtual appliance in accordance with some embodiments. In some embodiments, process 700 can be implemented at least in part on system 400.

At 702, a plurality of compute units implementing a network service associated with the distributed virtual appliance is executed. For example, after an ESM receives a set of policies for the new DVA layout, the ESM could create the DVA based on those policies by allocating a set of compute units to the DVA. The compute units are implemented to be data planes, data planes dispatchers, and data planes managers, which will work in concert to provide the functions associated with the network service (e.g., as indicated by the configuration information for the network service) of the DVA.

At 704, a new compute unit is added to the distributed virtual appliance, wherein the new compute unit is automatically self-configured for implementing the network service upon being added to the distributed virtual appliance. For example, in response to a certain event (e.g., by selection of a user at the ESM and/or when the monitored usage of data plane units of the DVA reaches a certain threshold), the ESM allocates a new compute unit to the DVA to be implemented as a data plane in order to increase the processing capacity of the DVA. The newly allocated compute unit is automatically self-configured to perform the network service that is associated with the DVA.

In various embodiments, the newly allocated compute unit can be considered as self-configured because the ESM that allocated it does not directly configure the compute unit's functionality as part of the DVA that it is assigned to. For example, when a compute unit is to be allocated to a DVA, the ESM defines the appropriate role (e.g., data plane, data planes dispatcher, data planes manager) for the compute unit and creates the compute unit (e.g., a VM) accordingly (at this point, the compute unit is still powered off). The ESM can define/implement/select a role for the compute unit by assigning to it various characteristics associated with a certain role. For example, a data planes manager compute unit needs to be provisioned with a persistent storage, and out-of-band network interface controller (NIC), and a management interface NIC; a data plane compute unit needs to be provisioned with an out-of-band NIC and an in-band NIC; a data planes dispatcher compute unit needs to be provisioned with an out-of-band NIC, an in-band NIC and a network interface NIC. In various embodiments, the ESM does not need to configure a software image that the compute unit needs to run nor the type of network service that is associated with the DVA to which it will be added. After defining/implementing/selecting a role for the compute unit, for example, the ESM allocates the compute unit to the appropriate DVA. The compute unit is powered on just before it joins the DVA. At the time of power on, the new compute unit is associated with a role and the DVA to which it now belongs. The new compute unit uses one or more of a network boot technology (e.g., PXE-boot) to retrieve the software image associated with the DVA from a data planes manager of the DVA. Once the new compute unit has fully booted the software image, it communicates to the data planes manager to indicate it will be joining the DVA. Then, the data planes manager permits the new compute unit to join the DVA and also pushes to the new compute unit the network service configuration information that is appropriate for its implemented role.

Figure 8:
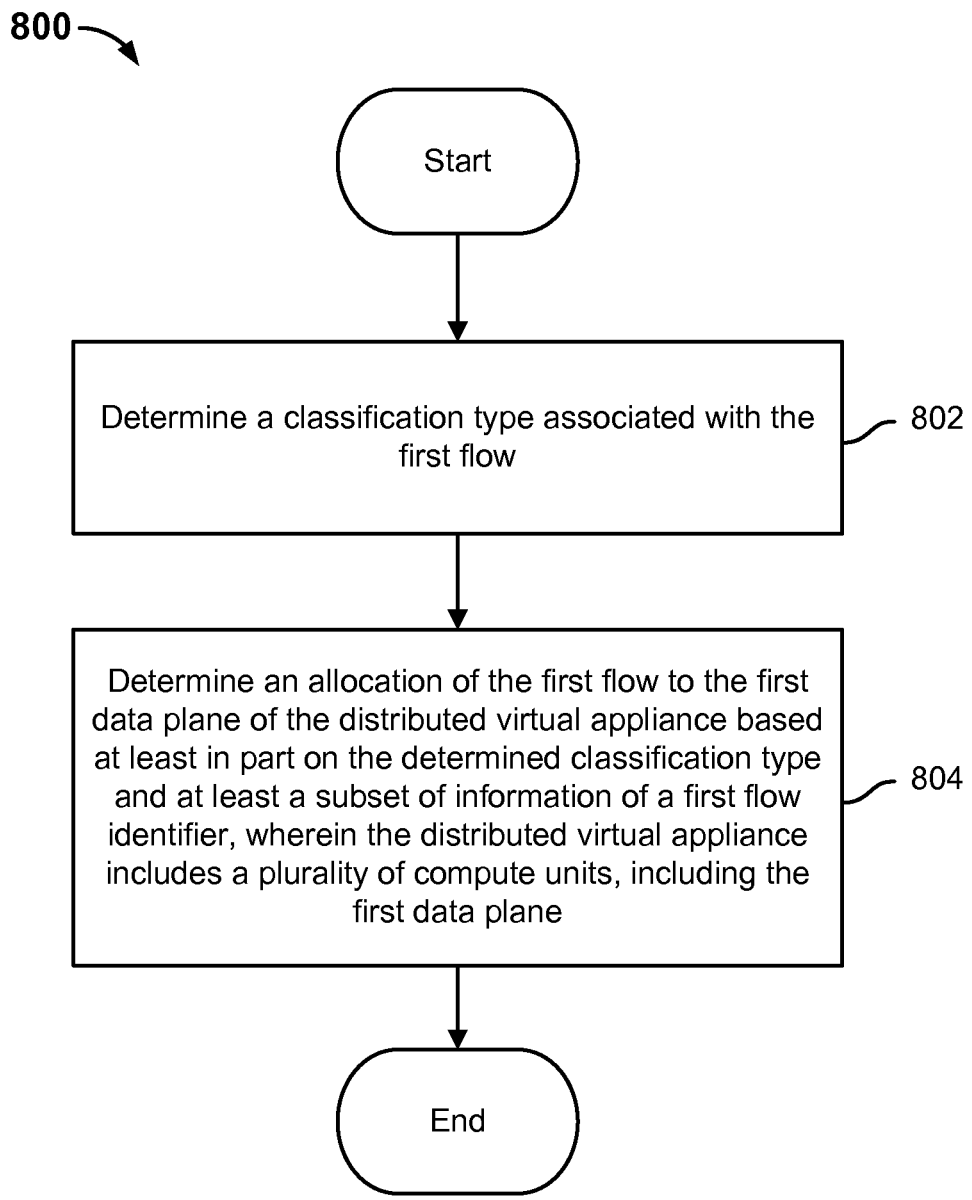
FIG. 8 is a flow diagram showing an embodiment of a process for allocating network traffic for a distributed virtual appliance in accordance with some embodiments.

FIG. 8 is a flow diagram showing an embodiment of a process for allocating network traffic for a distributed virtual appliance in accordance with some embodiments. In some embodiments, process 800 can be implemented using system 400.

At 802, a classification type associated with the first flow is determined.

In various embodiments, a data planes dispatcher compute unit of a DVA is configured to distribute received network packets to the data plane compute units for which it manages network traffic allocation of the DVA. In some embodiments, when the data planes dispatcher receives a network packet from an outside entity (e.g., a router), it determines a classification type associated with a packet. In some embodiments, the classification type associated with the packet can either be known data or unknown data. In some embodiments, a packet that is determined to be of the classification type of known data is destined for the DVA. For example, data that is destined for the DVA can refer to client traffic that "terminates" at the DVA or server traffic responses to traffic that "originates" from the DVA. Known data can also refer to non-IP traffic (e.g., network layer 2 traffic such as ARP traffic), traffic for which the source IP address ($S_{ip}$) and the source TCP or UDP port ($S_{port}$) are known, traffic for which the destination IP address ($D_{ip}$) is known (e.g., traffic that is not TCP or UDP related), or traffic for which the $D_{ip}$ and the destination TCP or UDP port ($D_{port}$) are known, for example. In some embodiments, a packet that is determined to be of the classification type of unknown data is traversing through the DVA (e.g., the DVA plays a "forwarder" role). For example, unknown data can refer to traffic that "crosses" the DVA when the DVA performs a transparent network service; the traffic is "unknown" because neither the source IP address nor the destination IP address of each packet matches any of the IP addresses configured on the network interfaces of the DVA.

In some embodiments, for a packet that is determined to be of the classification type of unknown data, the data planes dispatcher applies one designated type of distribution algorithm, such as a basic "layer 3 hash" to the packet and distributes the packet to the appropriate data plane compute unit.

In some embodiments, for a packet that is determined to be of the classification type of known data, the data planes dispatcher uses a selection logic to select one of many possible distribution algorithms for the packet.

At 804, an allocation of the first flow to the first data plane of the distributed virtual appliance is determined based at least in part on the determined classification type and at least a subset of information of a first flow identifier, wherein the distributed virtual appliance includes a plurality of compute units, including the first data plane.

In various embodiments, the data planes dispatcher compute unit determines to which data plane compute unit the packet associated with the first flow is to be distributed.

As mentioned above, in some embodiments, for a packet that is determined to be of the classification type of unknown data, the data planes dispatcher uses one designated distribution algorithm (e.g., a "layer 3 hash") to determine the data plane compute unit to distribute the packet to. The "layer 3 hash" can be a hash that, for example, uses only IP address information and ignores TCP/UDP port information. In some embodiments, for a packet that is determined to be of the classification of unknown data, the data planes dispatcher can apply a distribution algorithm other than a basic "layer 3 hash." In some embodiments, unlike the case of a packet associated with unknown data which is distributed using only one type of distribution algorithm, the case of a packet associated with known data can be distributed using one of many possible types of distribution algorithms.

In some embodiments, for a packet that is determined to be of the classification type of known data, one of many possible distribution algorithms can be selected via a selection logic. In some embodiments, the data planes dispatchers can apply a selection logic on the packet using at least a subset of information extracted from the packet header to select a distribution algorithm. In some embodiments, the selected distribution algorithm is then used by the data planes dispatcher compute unit to distribute the packet to an appropriate data plane compute unit.

In a specific example, a data planes dispatcher uses a selection logic that includes a first hash function to select a distribution algorithm that includes a second hash function. The second hash function then maps to a data plane to which a packet is to be distributed. In the example, a set of information including the same type of known traffic (e.g., two-tuple, either the known ($D_{ip}$, $D_{port}$) or the known ($S_{ip}$, $S_{port}$)) is extracted from the header (e.g., an identifier) of the packet and input into a first (e.g., perfect) hash function to determine the appropriate parameters (e.g., $P(S_{ip}, S_{port})$ or $P(D_{ip}, D_{port})$) to be used to select an appropriate distribution algorithm for that type of traffic using a second hash function. Then, for example, the application of a distribution algorithm for a set of known ($D_{ip}$, $D_{port}$) can be represented as DistriAlg[$D_{ip}$, $D_{port}$](P[$D_{ip}$, $D_{port}$] $S_{ip}$, $S_{port}$), which indicates to select the distribution algorithm that maps to the traffic of known ($D_{ip}$, $D_{port}$) using the parameters that match the specific ($D_{ip}$, $D_{port}$) in the packet, and to run the distribution algorithm with the parameters $P(D_{ip}, D_{port})$ using ($S_{ip}$, $S_{port}$) as inputs. As such, in the example, input to the first hash (i.e., selection logic) would be the known data (i.e., ($D_{ip}$, $D_{port}$)), while the other extracted data (i.e., ($S_{ip}$, $S_{port}$)) are input into the second hash function (i.e., the selected distribution algorithm). In some embodiments, the selection logic can be implemented as a perfect hash function (e.g., that is determined by a brute force computation). In the example where the selection logic is a first hash function, a modulus operation can be used as the first hash function; the divisor value can be increased until a perfect hash function is created for the dividend value that is based on the extracted header information. In the example where the distribution algorithm is a second hash function, the second hash function maps input values into one of a set of buckets and each bucket can be associated with a data plane compute unit (e.g., that is assigned to the bucket by the data planes dispatcher compute unit) of the DVA. In some embodiments, the set of associations/assignments between each bucket and the data plane compute unit that is assigned to it is included in the parameters associated with each set of extracted known data (either known ($D_{ip}$, $D_{port}$) (i.e., $P(D_{ip}, D_{port})$) or ($S_{ip}$, $S_{port}$) (i.e., $P(S_{ip}, S_{port})$)) that is stored and retrieved with the determined distribution algorithm. In some embodiments, one or more network traffic flows are mapped to the same bucket by the second hash function (i.e., multiple flows are mapped to the same data plane compute unit). Also in the example, as compute units are added to or removed from a DVA, the data planes dispatcher compute unit changes the association (e.g., assignment) between a bucket of the second hash function and a data plane compute unit (i.e., it changes the contents of each set of parameters $P(S_{ip}, S_{port})$ and $P(D_{ip}, D_{port})$).

In some embodiments, for a packet that is determined to be of the classification type of known data, a set of information (e.g., known ($D_{ip}$, $D_p$) or known ($S_{ip}$, $S_p$)) is extracted from the header of the packet and input into one hash function to determine a data plane compute unit to which the data planes dispatcher will distribute the packet.

In some embodiments, for a packet that is determined to be of the classification type of known data and that is also determined to be neither TCP or UDP, if the $D_{ip}$ of the packet is known, then an IP-protocol-based round robin is implemented to determine a data plane compute unit to which the data planes dispatcher will distribute the packet. For example, if the network traffic is associated with ESP payloads (associated with a VPN network service) that are terminated by the DVA, then the individual packets would be sent to a set of data plane compute units in a round robin fashion.

In some embodiments, for a packet that is determined to be of the classification type of known data, the packet is distributed by a data planes dispatcher compute unit to an IP-protocol-based well-known data plane compute unit. For example, if the network traffic is associated with an internet control message protocol (ICMP) ping, then all of the individual packets would be distributed to one specific data plane compute unit that was elected to accept those packets.

In some embodiments, for a packet that is determined to be of the classification type of known data, if the packet is associated with Address Resolution Protocol (ARP) responses to a DVA Media Access Control (MAC) address, then the packet is distributed to one specific data plane compute unit. In some embodiments, this data plane compute unit will pass the packet to other data plane compute units in a daisy chain fashion. For example, an "ARP response" that is received at the DVA needs to be known to all the data plane compute units of a DVA, so the daisy chain technique can be used to allow one data plane to send the same ARP response to the next data plane, which will in turn send it to the next data plane and so forth, so that all the data planes of the DVA will eventually receive the ARP response. The data planes dispatcher, for example, can determine the daisy chain order. In some embodiments, this data plane compute unit does not forward the packet to another data plane compute unit and instead, processes the packet (e.g., responds to the packet). For example, an "ARP request" that is received at the DVA needs an IP address resolution and so only one data plane needs to respond to such a request.

Figure 9:
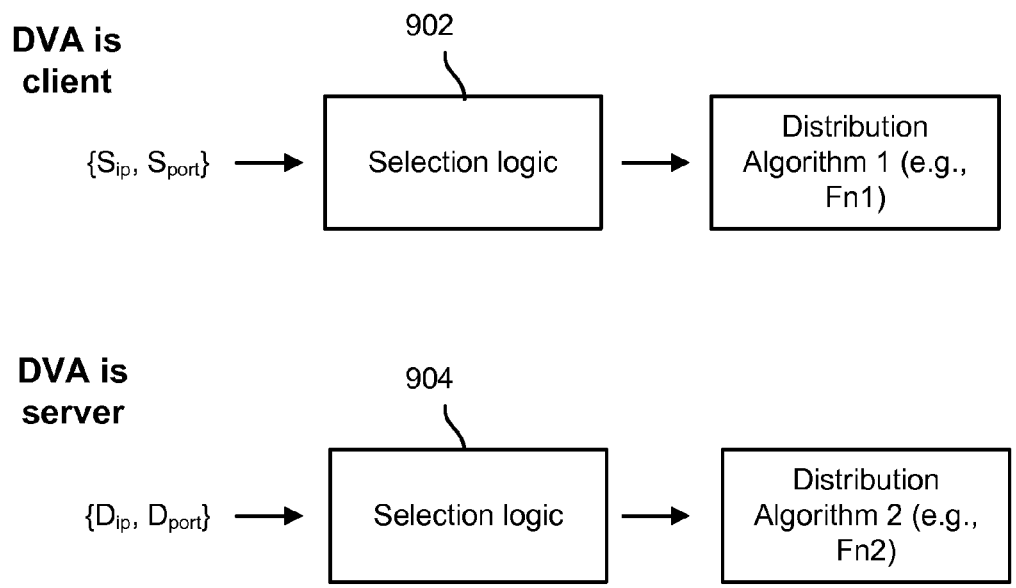
FIG. 9 is an example showing the input of extracted packet header information into a selection logic in accordance with some embodiments.

FIG. 9 is an example showing the input of extracted packet header information into a selection logic in accordance with some embodiments.

In various embodiments, the DVA can be implemented to perform a network service at the server-side or at the client-side. In some embodiments, when the DVA is implemented to perform a network service at either the server or client side, the network data received at the DVA is determined to be of the classification type of known data. In some embodiments, when a data planes dispatcher compute unit receives a packet, the data planes dispatcher does not know whether the DVA of which it is a part is configured to act as a server or as a client to the received packet. To determine whether the DVA is configured to act as a server or as a client to the received packet, the data planes dispatcher compute unit can, for example, perform a first hash function (e.g., a selection logic) for both the extracted ($S_{ip}$, $S_{port}$) and ($D_{ip}$, $D_{port}$) of the received packet. Only one of the two hashes of ($S_{ip}$, $S_{port}$) and ($D_{ip}$, $D_{port}$) would result in a successful hash lookup so depending on which of the hashes results in a successful hash lookup, the data planes dispatcher compute unit would know whether, in this case, the DVA is to act as a server or client. For example, if the first hash for ($S_{ip}$, $S_{port}$) yields a successful hash lookup, then the DVA is configured to act as a client for the received packet. But if the first hash for ($D_{ip}$, $D_{port}$) yields a successful hash lookup, then the DVA is configured to act as a server for the received packet.

In some embodiments, the same first hash function is used regardless of whether the DVA is implemented at the client or server side (e.g., the first hash function of selection logic 902 is the same as the first hash function of selection logic 904). In some embodiments, a data planes dispatcher compute unit that receives a network packet (from an outside entity) that terminates at the DVA extracts information and/or performs a selection logic and a distribution algorithm (e.g., one or more hash functions) on the extracted information to determine to which data plane compute unit the received network packet is to be distributed.

In some embodiments, a selection logic includes a first hash function that comprises a perfect hash (meaning that there are no collisions and so each valid input value maps to a distinct output value). In some embodiments, the determination of the divisor that makes the first hash function a perfect hash is implemented using a brute force computation. For example, the first hash function can comprise of a modulus operation, where the input value (i.e., dividend) is the extracted header information (e.g., a value based on the extracted sequence of bits such as [Interface (4 bits) VLAN (12 bits) IP (32 bits) Port (16 bits)]) and the remainder is the output value/bucket/hash value. Then, the divisor of this modulus operation is determined by increasing the value of the divisor until no two possible pieces of extracted information can yield the same remainder.

In the example, for the given input of the two-tuple ($S_{ip}$, $S_{port}$), the first hash function of selection logic 902 has identified a distribution algorithm (e.g., a second hash function Fn1) and associated parameters (e.g., a table that is used to keep track of the mappings between data plane compute units and buckets of second hash function Fn1). So, for the packet from which the two-tuple ($S_{ip}$, $S_{port}$) was extracted, additional information can be extracted (e.g., ($D_{ip}$, $D_{port}$)) so that at least a subset of the entire set of extracted information (e.g., ($S_{ip}$, $D_{ip}$, $S_{port}$, $D_{port}$)) can be used to input into the second hash function identified as Fn1. Similarly, in the example, for the given input of the two-tuple ($D_{ip}$, $D_{port}$), the first hash function of selection logic 904 has identified another distribution algorithm (e.g., another second hash function Fn2) and associated parameters (e.g., a table that is used to keep track of the mappings between data plane compute units and buckets of second hash function Fn2). So, for the packet from which the two-tuple ($D_{ip}$, $D_{port}$) was extracted, additional information can be extracted (e.g., ($S_{ip}$, $S_{port}$)) so that at least a subset of the entire set of extracted information (e.g., ($S_{ip}$, $D_{ip}$, $S_{port}$, $D_{port}$)) can be used to input into the second hash function identified as Fn2.

Figure 10:
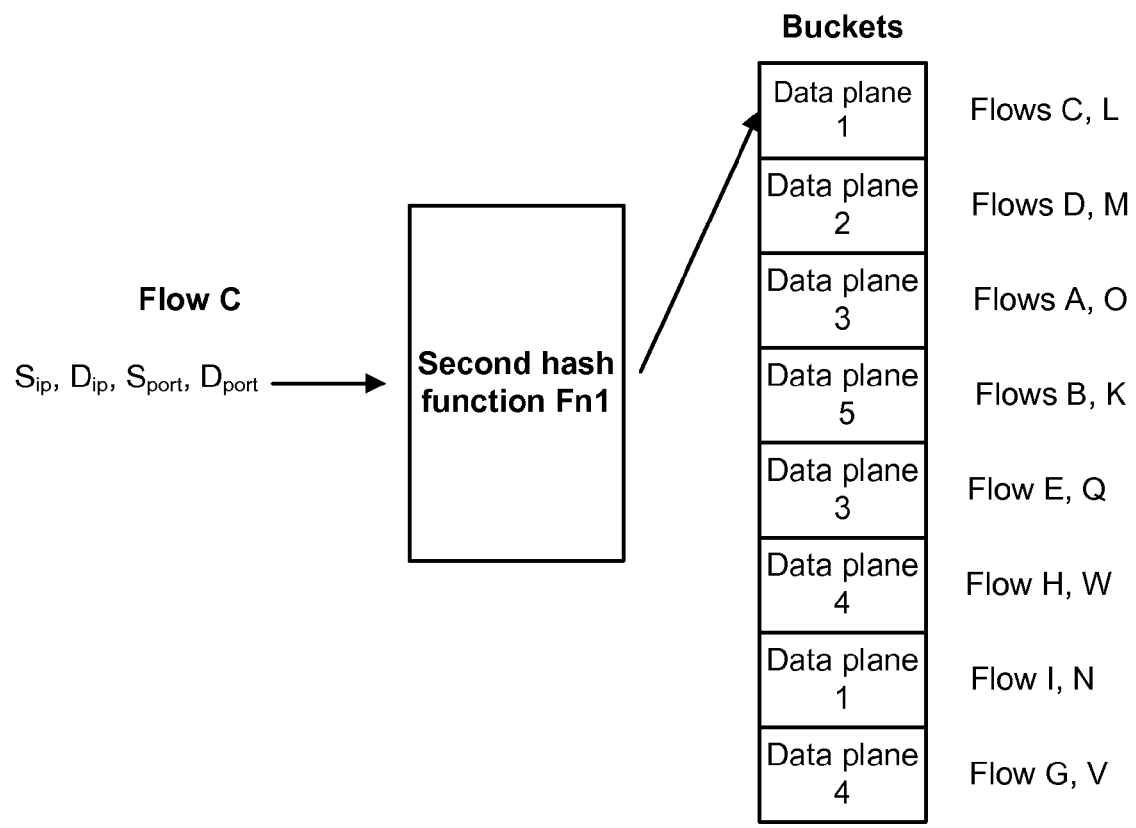
FIG. 10 is an example showing the input of extracted packet header information into a second hash function in accordance with some embodiments.

FIG. 10 is an example showing the input of extracted packet header information into a second hash function in accordance with some embodiments. In various embodiments, the second hash function (e.g., a selected distribution algorithm) is performed by the data planes dispatcher compute unit in a system such as system 400. In some embodiments, information (e.g., a four-tuple ($S_{ip}$, $D_{ip}$, $S_{port}$, $D_{port}$)) is extracted from a (e.g., TCP or UDP) packet header. In various embodiments, the information extracted from the packet header uniquely represents a particular flow of network traffic. In various embodiments, the second hash function maps an input value (e.g., either the source or destination information from the four-tuple ($S_{ip}$, $D_{ip}$, $S_{port}$, $D_{port}$)) to a particular parameter (e.g., bucket) of that second hash function. In various embodiments, the second hash function is designed so that extracted information associated with a particular network traffic flow always maps to the same bucket. In some embodiments, each bucket of the second hash function is associated with a data plane compute unit to which the data planes dispatcher will distribute the packet. The association between a bucket of the second hash function and the data plane compute unit is determined by a data planes dispatcher compute unit using the parameters of the second hash function. In some embodiments, a data plane compute unit can be associated with more than one bucket. In some embodiments, the data plane compute unit associated with a bucket receives all the network packets (e.g., belonging to one or more network traffic flows) that are mapped to that bucket by the data planes dispatcher compute unit. In some embodiments, approximately the same number of network traffic flows is assigned to each bucket (although each data plane compute unit may be assigned to one or more buckets, depending on each data plane compute unit's respective processing capacity).

In the example, second hash function Fn1 was mapped to (e.g., identified or selected) by a first hash function which also used information extracted from the packet. Flow C of the input that was uniquely identified as the input in the form of ($S_{ip}$, $D_{ip}$, $S_{port}$, $D_{port}$) is mapped to the appropriate bucket by second hash function Fn1. In the example, the data planes dispatcher compute unit has determined that Data plane 1 is most likely responsible for managing network traffic associated with Flow C and so allocates the packet to Data plane 1. The example also shows to which buckets and associated data plane compute units other flows (e.g., Flow D, Flow A, Flow B, Flow E, Flow H, Flow I, Flow G, Flow L, Flow M, Flow O, Flow K, Flow Q, Flow N, Flow V and Flow W) map. As shown in the example, a data plane compute unit can be assigned to/associated with a certain bucket and become responsible for the one or more network traffic flows that are hashed by the second hash function Fn1 to that bucket.

Figure 11:
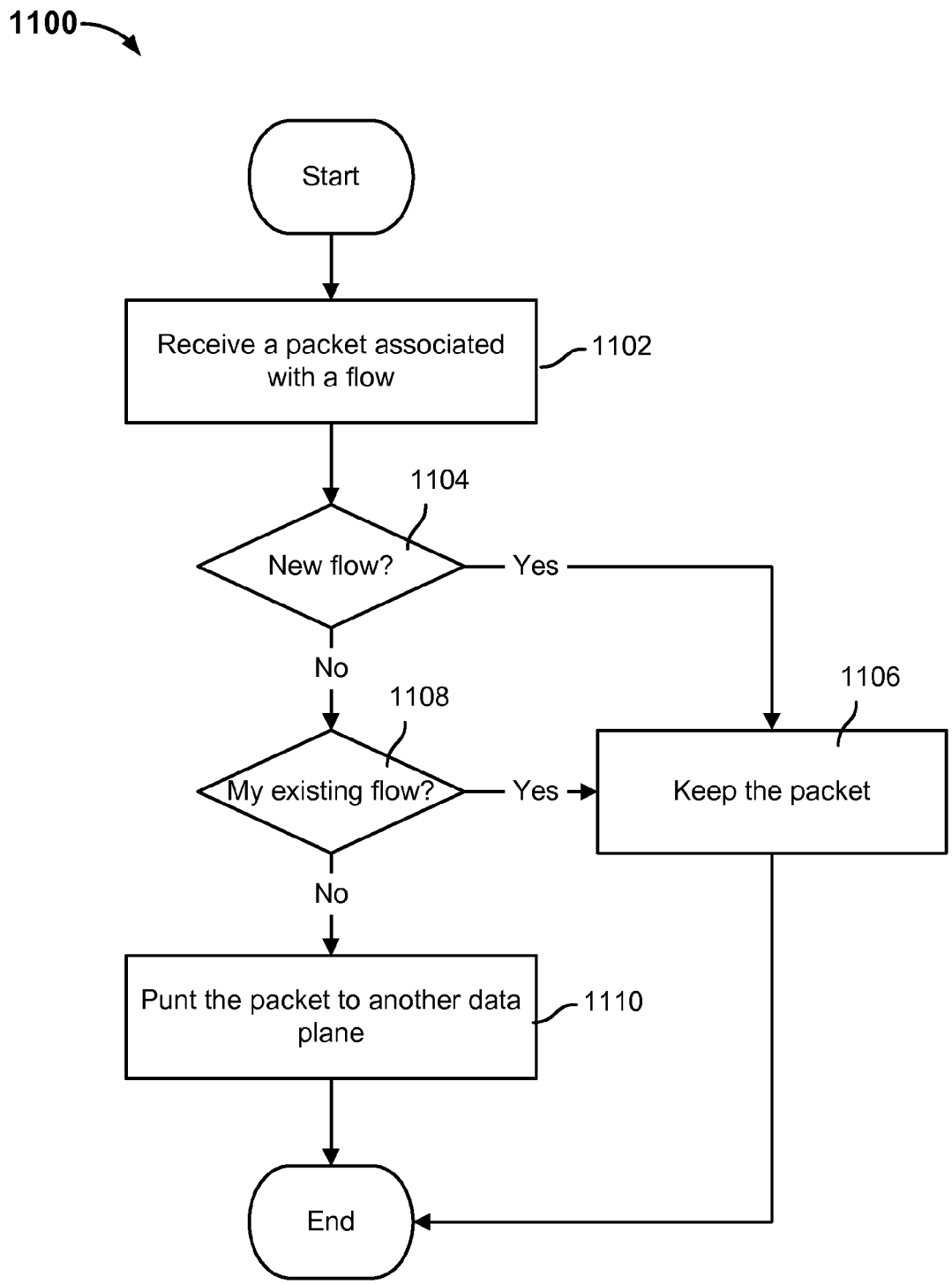
FIG. 11 is a flow diagram showing an embodiment of a process at a data plane compute unit that receives a packet from a data planes dispatcher compute unit in accordance with some embodiments.

FIG. 11 is a flow diagram showing an embodiment of a process at a data plane compute unit that receives a packet from a data planes dispatcher compute unit in accordance with some embodiments. In some embodiments, process 1100 can be implemented at a data plane compute unit of system 400. In some embodiments, process 1100 begins after a data planes dispatcher compute unit distributes a packet to the data plane compute unit after determining that the data plane compute unit is associated with the bucket identified by a second hash function. At 1102, the packet is received by the data plane compute unit. At 1104, it is determined whether the packet is a new flow for which no data plane compute units of the DVA has previously received packets. For example, a new flow can be indicated by a SYN packet, which indicates the start of a connection. If it is determined that the packet is associated with a new flow, then control passes to 1106, and the recipient data plane compute unit will keep and process the packet and be responsible for managing that flow (e.g., by processing subsequently received packets that are identified to be associated with that flow). Otherwise, if it is determined that the packet is not associated with a new flow but with an existing flow, meaning that a data plane compute unit at the DVA has already received and processed packets associated with that flow, then control passes to 1108. At 1108, it is determined whether the existing flow is managed by the recipient data plane compute unit. If it is determined that the recipient data plane compute unit is responsible for managing the flow, then control passes to 1106 and the data plane compute unit keeps and processes the packet. For example, the recipient data plane compute unit can determine that it is responsible for managing the flow, for example, by determining that it has stored information (e.g., TCP state/packet sequence numbers) associated with that flow. So, if a data plane compute unit has stored TCP state information associated with a flow, it indicates that the data plane compute unit has managed the flow since the first received packet of that flow (e.g., the SYN packet). Otherwise, if it is determined that the recipient data plane compute unit is not the data plane compute unit that is responsible for managing the flow, then control passes to 1110 and the packet is punted or passed to another data plane compute unit. In some embodiments, the packet is passed to a predecessor data plane compute unit (e.g., as indicated in a history table), which is the data plane compute unit that the data planes dispatcher compute unit previously associated with the bucket. In some embodiments, the packet can be punted from one data plane compute unit to another in a daisy chain manner until a recipient data plane compute unit identifies the packet as being associated with a flow that it manages. However, if no data plane compute unit of the DVA identifies the packet, then the packet is discarded.

Figure 12:
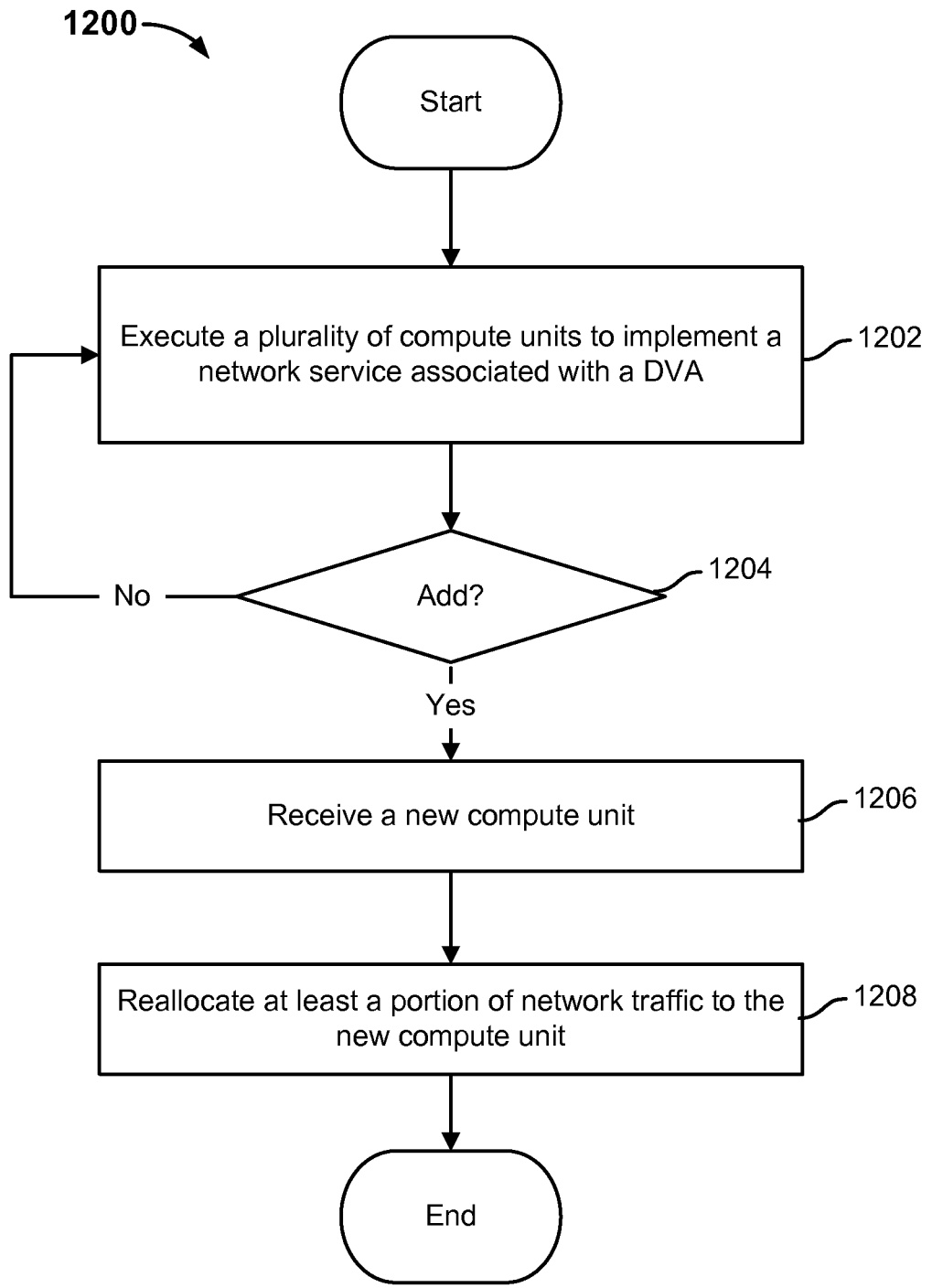
FIG. 12 is a flow diagram showing an embodiment of a process of adding a compute unit to a DVA in accordance with some embodiments.

FIG. 12 is a flow diagram showing an embodiment of a process of adding a compute unit to a DVA in accordance with some embodiments. In some embodiments, process 1200 can be implemented on system 400. At 1202, a plurality of compute units is executed to implement a network service associated with a DVA. For example, the plurality of compute units can include one or more data plane compute units, one or more data planes dispatcher compute units, and one or more data planes manager compute units that are allocated by the ESM to perform a particular network service. At 1204, it is determined if an additional compute unit needs to be added to the DVA. For example, at 1204, the DVA could receive an indication that a new compute unit is to be added. For example, an additional compute unit can be added to the DVA in response to an event. Examples of the event can include a user selecting to add one or more compute units (e.g., data plane compute units) at a user interface associated with the ESM that manages the DVA (e.g., in preparation for a potential future surge in processing needs) or the ESM automatically detecting that the DVA needs more processing capacity based on the monitored usage of the compute units of the DVA exceeding a certain threshold (e.g., that is specified in the set of ESM policies for the layout of the DVA). If it is determined that a compute unit does not need to be added, then control passes back to 1202. If it is determined that a compute unit does need to be added, then control passes to 1206. For example, in response to receiving an indication to add a compute unit for a DVA, the ESM could allocate an available compute unit to the DVA via a set of APIs. In some embodiments, the new compute unit can be configured by the ESM to assume a role (e.g., one of a data plane, data planes dispatcher, or data planes manager) that is needed by the DVA. At 1208, at least a portion of the network traffic is reallocated to the new compute unit at the DVA. For example, assume that the new compute unit is implemented as a data plane. Then network traffic can be reallocated by virtue of a data planes dispatcher compute unit assigning the new data plane compute unit to one or more buckets associated with the second hash function, including by replacing the assignments of other data plane compute units to at least some of those buckets. As the network traffic is directed to the buckets assigned to the new data plane compute unit, the data plane compute unit will punt (e.g., pass) packets associated with existing flows that are managed by other data plane compute units but keep packets associated with new flows or existing flows that it itself manages. Over time, the new data plane compute unit will process a share of the DVA's network traffic without disrupting existing traffic to other data plane compute units.

Figures 13A, 13B:
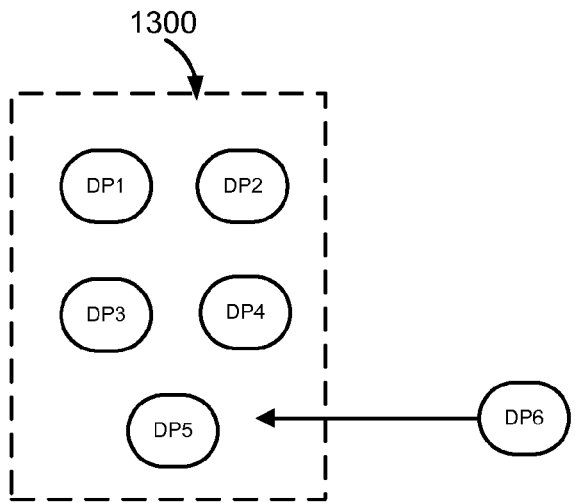
FIGS. 13A and 13B illustrate an example of adding a data plane compute unit to a DVA in accordance with some embodiments.

FIGS. 13A and 13B illustrate an example of adding a data plane compute unit to a DVA in accordance with some embodiments. In the example, DVA 1300 originally included five data plane compute units (Data plane 1 "DP1," Data plane 2 "DP2," Data plane 3 "DP3," Data plane 4 "DP4," and Data plane 5 "DP5"). Assume that when using a process, such as process 1200, it is determined that another data plane compute unit is to be added to DVA 1300 to increase the processing capacity for the network service associated with DVA 1300. A new data plane compute unit, DP6, is then allocated by an ESM and added to DVA 1300.

In the example, buckets 1302 represent the buckets associated with a second hash function (e.g., second hash function Fn1 of FIG. 10). Each bucket of buckets 1302 is associated with one data plane compute unit and one or more traffic flows that always map to that bucket (e.g., by second hash function Fn1). Prior to the addition of DP6, each bucket of buckets 1302 was assigned to one of the five original data plane compute units (DP1, DP2, DP3, DP4, or DP5). However, since the addition of DP6 to the DVA, some buckets (and also their associated flows) are reassigned from their original data plane compute units to DP6. In the example, it is shown that the bucket associated with Flows C and L are reassigned from Data plane 1 (DP1) to new Data plane 6 (DP2) and that the bucket associated with Flows A and O are reassigned from Data plane 3 (DP3) to new Data plane 6 (DP6). So, after the addition of DP6 and the reassignment, packets associated with Flows C and L will now be first distributed to DP6 instead of DP1. Also, packets associated with Flows A and O will now be first distributed to DP6 instead of DP3. In some embodiments, the reassignment of buckets to data plane compute units is reflected in a history table that is stored in memory associated with the DVA.

FIGS. 14A, 14B, and 14C illustrate examples of updating a history table in association with the addition of a new data plane compute unit to a DVA and the reallocation of network traffic in the DVA in accordance with some embodiments.

FIG. 14A shows an example of a history table associated with a DVA. In some embodiments, a history table (e.g., stored in memory) is associated with a DVA and can be accessed by all the compute units associated with the DVA. In the example, the history table includes a set of buckets (e.g., Buckets a through r) associated with a distribution algorithm that includes a second hash function. The first column of the history table includes the data plane compute unit that is currently assigned to a corresponding bucket and directly receives from the data planes dispatcher compute unit the one or more flows that map to that bucket. The second and third columns include, if appropriate, the data plane compute units that were previously assigned to the corresponding bucket (i.e., "predecessors") and had received the one or more flows that mapped to that bucket before they were replaced by another data plane compute unit (e.g., a newly added data plane compute unit). While the example history table includes columns for only the first and second predecessors, a history table can include any number of predecessors. For example, continuing the example from FIGS. 13A and 13B, a packet associated with Flow A is mapped to Bucket c, which is currently associated with Data plane 6 (which was recently added to the DVA). However, Bucket c was previously associated with Data plane 3 and so packets associated with Flow A were previously first distributed to the first predecessor Data plane 3. In the example, Bucket c does not have a second predecessor (i.e., a data plane compute unit that was assigned to receive packets mapped to Bucket c before Data plane 3). Because the first and only predecessor of Bucket c in this example is Data plane 3, it is implied that (e.g., using a process such as process 1200 at Data plane 3) Data plane 3 was the first data plane compute unit to receive Flow A when it was a new flow and so Data plane 3 is responsible for managing Flow A until Flow A terminates. Once Data plane 6 receives a packet that is associated with Flow A (i.e., an existing flow) from the data planes dispatcher compute unit, it will punt the packet to Data plane 3, which is responsible for managing that flow. By virtue of needing to punt the packet from one data plane to another (e.g., Data plane 6 to Data plane 3), there is a daisy chain of one hop associated with Flow A. The use of a daisy chain to redirect traffic associated with existing flows to the responsible data plane compute unit ensures that traffic to the DVA can be reallocated without disrupting or dropping traffic to the DVA. In some embodiments, the DVA will reach a steady or stable state, meaning that all daisy chains will be zero. Put another way, when the DVA reaches a steady or stable state, a data plane compute unit will no longer need to punt a packet that it receives to any other data plane compute unit (e.g., due to the fact that flows associated with a predecessor data plane compute unit will terminate over time).

FIG. 14B shows an example of a data plane compute unit punting a packet to another predecessor data plane compute unit in accordance with some embodiments. In the example, a packet associated with existing Flow A (e.g., that is mapped to Bucket c) is distributed by a data planes dispatcher to Data plane 6 (e.g., the data plane that is currently assigned to Bucket c). Upon receiving the packet, Data plane 6 can perform a process such as process 1100 to determine that the packet is part of an existing flow that it does not manage. Data plane 6 can look up the history table (e.g., the example of FIG. 14A) to see that the first and only predecessor data plane compute unit for Bucket c is Data plane 3. Then, Data plane 6 can punt the packet to Data plane 3. Upon receiving the packet, Data plane 3 can also perform a process such as process 1100 to determine that the packet is an existing flow and is also managed by Data plane 3. Data plane 3 will then keep the packet and process it. Data plane 6 will continue to punt packets it receives that are associated with Flow A until Flow A terminates. While in this example, Data plane 3 is the data plane compute unit that manages the packet that it receives, in another scenario where Data plane 3 receives a packet that it does not manage, it can look up the history table for another predecessor data plane compute unit to punt the packet to or discard the packet if no predecessor is found.

FIG. 14C shows an example of a data plane compute unit receiving a packet from a new flow. In the example, Data plane 6 receives a packet associated with new Flow R (e.g., new Flow R was mapped to Bucket c, which is currently associated with Data plane 6). Upon receiving the packet, Data plane 6 can perform a process such as process 1100 and determine that the packet (e.g., a SYN packet) is associated with a new flow and so it should keep the packet.

Figure 15:
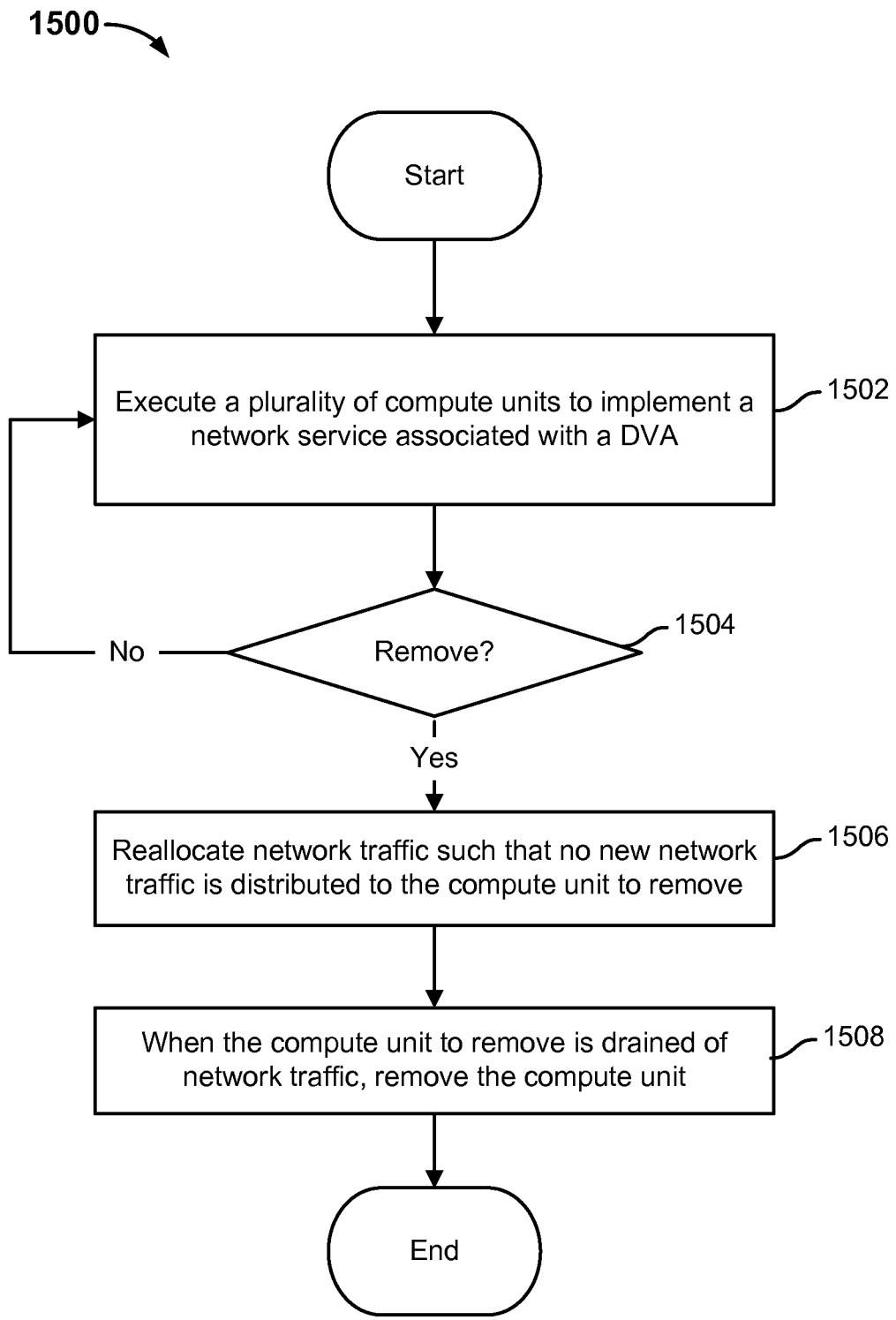
FIG. 15 is a flow diagram showing an embodiment of a process of removing a compute unit from a DVA.

FIG. 15 is a flow diagram showing an embodiment of a process of removing a compute unit from a DVA. In some embodiments, process 1500 can be implemented on system 400. At 1502, a plurality of compute units is executed to implement a network service associated with a DVA. For example, the plurality of compute units can include one or more data plane compute units, one or more data planes dispatcher compute units, and one or more data planes manager compute units that are allocated by the ESM to perform a particular network service. At 1504, it is determined if a compute unit needs to be removed from the DVA. For example, at 1504, the DVA could receive an indication that a compute unit is to be removed. For example, a compute unit can be removed from the DVA in response to an event. Examples of the event can include a user selecting to remove one or more compute units (e.g., data plane compute units) at a user interface associated with the ESM that manages the DVA (e.g., after a slow down in processing needs has been detected) or the ESM automatically detecting that the DVA needs less processing capacity based on the monitored usage of the compute units of the DVA falling below a certain threshold (e.g., that is specified in the set of ESM policies for the layout of the DVA). If it is determined that a compute unit does not need to be removed, then control passes back to 1502. If it is determined that a compute unit does need to be removed, then control passes to 1506. For example, in response to receiving an indication to remove a compute unit for a DVA, the ESM could communicate to a data planes manager compute unit of the DVA to stop allocating new flows to the compute unit to remove. In some embodiments, the data planes manager compute unit then turns around and notifies a data planes dispatcher to stop allocating new flows to the compute unit that is to be removed. At 1506, network traffic is reallocated such that no new network traffic is distributed to the compute unit to remove. For example, assume that the compute unit to remove is a data plane compute unit. The data planes dispatcher compute unit can stop allocating new flows to the data plane compute unit that is to be removed by reassigning other data plane compute units to the buckets of the second hash function associated with the compute unit to remove. This way, any new flows will always be first distributed to a data plane compute unit other than the data plane compute unit that is to be removed and so it never receives or manages any more new flows. Eventually, the existing flows associated with the data plane compute unit to remove will terminate. Once all the existing flows associated with the data plane compute unit to remove terminate, then control passes to 1508. At 1508, when the compute unit to remove is drained of network traffic, the compute unit is removed. For example, the ESM could remove the compute unit from the DVA (e.g., via APIs) and return the resources of the compute unit back to the hardware from which it was provisioned so that they may be used for the same or other DVAs (e.g., when the need arises). By preventing new flows from reaching the data plane compute unit to remove and waiting for the existing network traffic processed by the data plane compute to end, a compute unit can be removed from a DVA without disruption to the network traffic for the DVA.

Figure 16A:
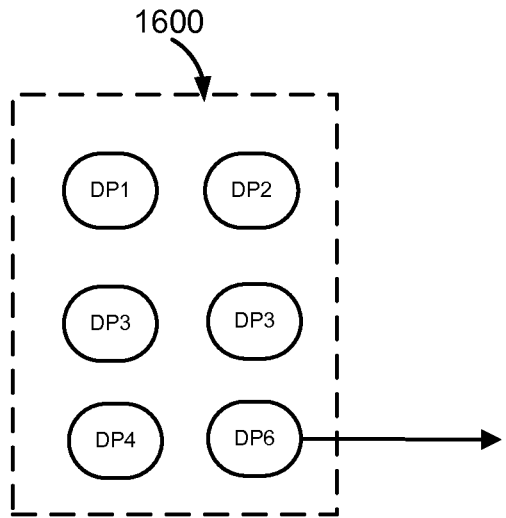
FIGS. 16A and 16B illustrate an example of removing a data plane compute unit from a DVA in accordance with some embodiments.
Figure 16B:
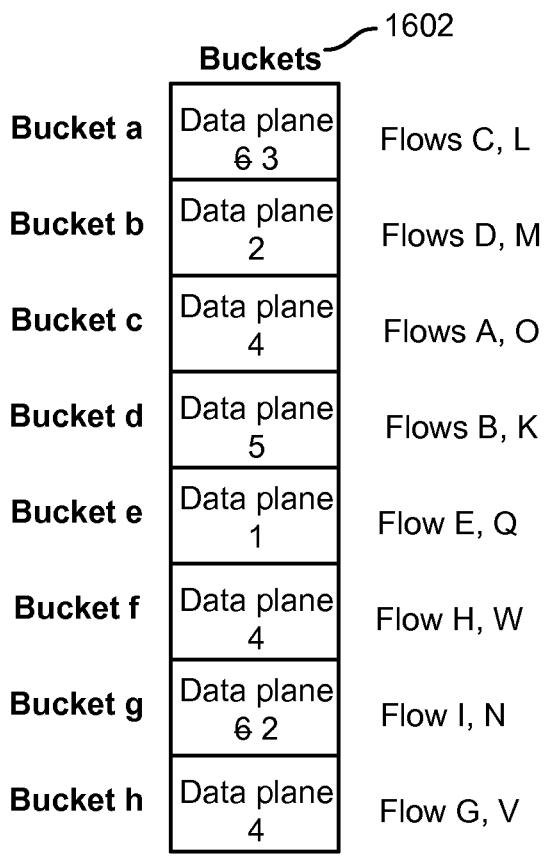

FIGS. 16A and 16B illustrate an example of removing a data plane compute unit from a DVA in accordance with some embodiments. In the example, DVA 1600 includes six data plane compute units (Data plane 1 "DP1," Data plane 2 "DP2," Data plane 3 "DP3," Data plane 4 "DP4," Data plane 5 "DP5," and Data plane 6 "DP6"). Assume that in using a process such as process 1500, it is determined that a data plane compute unit, DP6, is to be removed from DVA 1600 to decrease the processing capacity for the network service associated with DVA 1600. So, it is communicated by the ESM to DVA 1600 to stop allocating new flows to DP6. Then, when all the network traffic is drained from DP6 (i.e., when all of its existing flows terminate), DP6 is removed.

In the example, buckets 1602 represent the buckets associated with a second hash function (e.g., second hash function Fn1 of FIG. 10). Each bucket of buckets 1602 is associated with one data plane compute unit and one or more traffic flows that always map to that bucket. Prior to the determination to remove DP6, each bucket of buckets 1602 was assigned to one of the six data plane compute units (DP1, DP2, DP3, DP4, DP5, and DP6). However, since the determination to remove DP6 from the DVA, some buckets (and also their associated flows) that were assigned to DP6 are reassigned to other data plane compute units. In the example, it is shown that the bucket associated with Flows C and L are reassigned from Data plane 6 (DP6) to Data plane 3 (DP3) and that the bucket associated with Flows I and N are reassigned from Data plane 6 (DP6) to Data plane 2 (DP2). So, after the determination to remove DP6 and the reassignment, packets associated with Flows C and L will now be first distributed to DP3 instead of DP6. Also, packets associated with Flows I and N will now be first distributed to DP2 instead of DP6. In some embodiments, the reassignment of buckets to data plane compute units is reflected in a history table that is stored in memory associated with the DVA. The effect of the reassignment is such that the compute unit to remove (DP6) will not be the first data plane compute unit to receive any new flows and will therefore be drained of network traffic once its existing flows terminate.

Figures 17A, 17B:
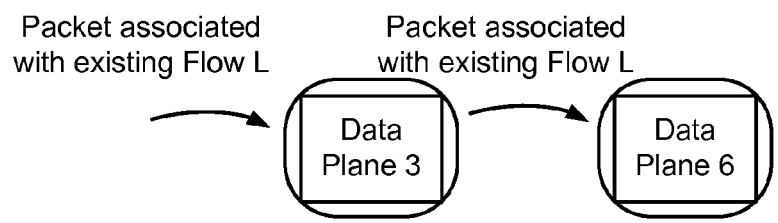
FIGS. 17A and 17B illustrate examples of updating a history table in association with the removal of a data plane compute unit from a DVA and the reallocation of network traffic in the DVA in accordance with some embodiments.

FIGS. 17A and 17B illustrate examples of updating a history table in association with the removal of a data plane compute unit from a DVA and the reallocation of network traffic in the DVA in accordance with some embodiments.

FIG. 17A shows an example of a history table associated with a DVA. In some embodiments, a history table (e.g., stored in memory) is associated with a DVA and can be accessed by all the compute units associated with the DVA. In the example, the history table includes a set of buckets (e.g., Buckets a through e) associated with a distribution algorithm that includes a second hash function. The first column of the history table includes the data plane compute unit that is currently assigned to a corresponding bucket and directly receives from the data planes dispatcher compute unit the one or more flows that map to that bucket. The second and third columns include, if appropriate, the data plane compute units that were previously assigned to the corresponding bucket (i.e., "predecessors") and have received the one or more flows that mapped to that bucket before they were replaced by another data plane compute unit (e.g., a newly added data plane compute unit). While the example history table includes columns for only the first and second predecessors, a history table can include any number of predecessors. For example, a packet associated with Flow L is mapped to Bucket a, which is currently associated with Data plane 3 (replacing Data plane 6, which is to be removed once its existing flows terminate). However, Bucket a was previously associated with predecessor Data plane 6. In the example, Bucket a does not have a second predecessor (i.e., a second predecessor would be a data plane compute unit that was assigned to Bucket a before Data plane 6). Because the first and only predecessor of Bucket a in this example is Data plane 6, it is implied that (e.g., using a process such as process 1200 at Data plane 6) Data plane 6 was the first data plane compute unit to receive Flow L when it was a new flow and so Data plane 6 is responsible for managing Flow L until Flow L terminates. Once Data plane 3 receives a packet that is associated with Flow L (i.e., an existing flow) from the data planes dispatcher compute unit, it will punt the packet to Data plane 6, which is responsible for managing that flow. By virtue of needing to punt the packet from one data plane (e.g., Data plane 3 to Data plane 6), there is a daisy chain of one hop associated with Flow L. The use of a daisy chain to redirect traffic associated with existing flows to the responsible data plane compute unit ensures that traffic to the DVA can be reallocated without disrupting or dropping traffic at the DVA.

FIG. 17B shows an example of a data plane compute unit punting a packet to another, predecessor data plane compute unit. In the example, a packet associated with existing Flow L (e.g., that is mapped to Bucket a) is distributed by a data planes dispatcher to Data plane 3 (e.g., the data plane that is currently assigned to Bucket a), which replaced Data plane 6 (e.g., that data plane that was previously assigned to Bucket a). Upon receiving the packet, Data plane 3 can perform a process such as process 1100 to determine that the packet is part of an existing flow that it does not manage. Data plane 3 can look up the history table (e.g., the example of FIG. 17A) to see that the first and only predecessor data plane compute unit for Bucket a is Data plane 6. Then Data plane 3 can punt the packet to Data plane 6 to process it. Upon receiving the packet, Data plane 6 can also perform a process such as process 1100 to determine that the packet is an existing flow and is also managed by Data plane 6. So, Data plane 6 will keep the packet and process it. Data plane 3 will continue to punt packets it receives that are associated with Flow L until Flow L terminates. When Flow L and all other existing flows managed by Data plane 6 terminate, the DVA can communicate with the ESM to remove Data plane 6.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for a distributed virtual appliance, comprising:
implementing the distributed virtual appliance to perform a network service, wherein the distributed virtual application comprises a plurality of compute units to operate together to implement the network service, wherein the plurality of compute units associated with the distributed virtual appliance is provisioned by a management tool, wherein implementing the distributed virtual appliance to perform the network service comprises:
configuring a first set of the plurality of compute units as a set of data planes dispatcher compute units, wherein a data planes dispatcher compute unit is configured to:
receive a packet associated with a network traffic flow via a network interface associated with the distributed virtual appliance; and
distribute the packet associated with the network traffic flow to a data plane compute unit of a set of data plane compute units of the plurality of compute units;
configuring a second set of the plurality of compute units as a set of data planes manager compute units, wherein a data planes manager compute unit is configured to:
receive a set of configuration information from the management tool, wherein the set of configuration information describes the network service to be performed by the distributed virtual appliance; and send at least a portion of the set of configuration information associated with a data plane compute unit role to the data plane compute unit;

configuring a third set of the plurality of compute units as the set of data plane compute units, wherein the data plane compute unit is configured to:

receive the at least portion of the set of configuration information associated with the data plane compute unit role from the data planes manager compute unit;

receive the packet associated with the network traffic flow from the data planes dispatcher compute unit; and process the packet associated with the network traffic flow based at least in part on the at least portion of the set of configuration information associated with the data plane compute unit role; and dynamically adding or removing, by the management tool, one or more data plane compute units associated with implementing the network service without disruption to network traffic associated with the distributed virtual appliance based at least in part on a set of policies associated with a layout associated with the distributed virtual appliance.

2. The method of claim 1, wherein each of the plurality of compute units is implemented using a virtual machine on a computer.

3. The method of claim 1, wherein the network service includes one or more of the following: intrusion detection, firewall, virtual private network (VPN), and load balancing.

4. The method of claim 1, wherein the network service comprises services associated with network layers 2, 3, 4, and/or 7.

5. The method of claim 1, wherein the data planes dispatcher compute unit is configured to distribute a plurality of network traffic flows to at least a subset of the set of data plane compute units based at least in part on tunneling over a logical in-band bus.

6. The method of claim 5, wherein the data planes dispatcher compute unit is configured to distribute each of the plurality of network traffic flows consistently across the set of data plane compute units.

7. The method of claim 1, wherein the data planes dispatcher is configured to distribute a variable amount of network traffic to at least one of the set of data plane compute units.

8. The method of claim 1, wherein the set of data plane compute units includes at least a first data plane compute unit and a second data plane compute unit, and further comprising:

removing the first data plane compute unit from the distributed virtual appliance; and automatically reallocating a portion of the network traffic from the first data plane to one or more other data plane compute units, including the second data plane compute unit, without disruption to the network traffic.

9. The method of claim 1, wherein the network traffic flow is consistently distributed to the data plane compute unit until the network traffic flow terminates.

10. The method of claim 1, further comprising:

receiving one or more input parameters at an application programming interface (API) associated with defining the distributed virtual appliance; and translating the one or more input parameters into the set of policies associated with the layout associated with the distributed virtual appliance.

11. The method of claim 10, wherein the set of policies associated with the layout associated with the distributed virtual appliance includes one or more of the following: a condition for when a new compute unit is to be added, a condition for when a compute unit is to be removed, bandwidth properties, throughput properties, latency properties, reliability characteristics properties, a number of data plane compute units to be allocated for the distributed virtual appliance, and a number of data planes dispatcher compute units to manage the allocated data plane compute units.

12. The method of claim 1, wherein the layout associated with the distributed virtual appliance is configured by the management tool.

13. The method of claim 1, wherein implementing the network service associated with the distributed virtual appliance is based at least in part on the set of configuration information associated with the distributed virtual appliance.

14. A distributed virtual appliance system, comprising:

a processor configured to:

implement the distributed virtual appliance to perform a network service, wherein the distributed virtual application comprises a plurality of compute units to operate together to implement the network service, wherein the plurality of compute units associated with the distributed virtual appliance is provisioned by a management tool, wherein to implement the distributed virtual appliance to perform the network service comprises to:

configure a first set of the plurality of compute units as a set of data planes dispatcher compute units, wherein a data planes dispatcher compute unit of the set of data planes dispatcher compute units is configured to:

receive a packet associated with a network traffic flow via a network interface associated with the distributed virtual appliance; and distribute the packet associated with the network traffic flow to a data plane compute unit of a set of data plane compute units of the plurality of compute units;

configure a second set of the plurality of compute units as a set of data planes manager compute units, wherein a data planes manager compute unit is configured to:

receive a set of configuration information from the management tool, wherein the set of configuration information describes the network service to be performed by the distributed virtual appliance; and send at least a portion of the set of configuration information associated with a data plane compute unit role to the data plane compute unit;

configure a third set of the plurality of compute units as the set of data plane compute units, wherein the data plane compute unit is configured to:

receive the at least portion of the set of configuration information associated with the data plane compute unit role from the data planes manager compute unit;

receive the packet associated with the network traffic flow from the data planes dispatcher compute unit; and process the packet associated with the network traffic flow based at least in part on the at least portion of the set of configuration information associated with the data plane compute unit role; and dynamically add or remove, by the management tool, one or more data plane compute units implementing the network service without disruption to network traffic associated with the distributed virtual appliance based at least in part on a set of policies associated with a layout associated with the distributed virtual appliance; and a memory coupled to the processor and configured to provide the processor with instructions.

15. The system of claim 14, wherein the network service comprises services associated with network layers 2, 3, 4, and/or 7.

16. The system of claim 14, wherein the data planes dispatcher compute unit is configured to distribute a plurality of network traffic flows to at least a subset of the set of data plane compute units based at least in part on tunneling over a logical in-band bus.

17. The system of claim 14, wherein the data planes dispatcher compute unit is configured to distribute each of the plurality of network traffic flows consistently across the set of data plane compute units.

18. The system of claim 14, wherein the set of data plane compute units includes at least a first data plane compute unit and a second data plane compute unit, and wherein the processor is further configured to:
 remove the first data plane compute unit from the distributed virtual appliance; and
 automatically reallocate a portion of the network traffic from the first data plane to one or more other data plane compute units, including the second data plane compute unit, without disruption to the network traffic.

19. The system of claim 14, wherein the network traffic flow is consistently distributed to one of the data plane compute unit units until the network traffic flow terminates.

20. The system of claim 14, wherein the processor is further configured to:
 receive one or more input parameters at an application programming interface (API) associated with defining the distributed virtual appliance; and
 translate the one or more input parameters into the set of policies associated with the layout associated with the distributed virtual appliance.

21. The system of claim 20, wherein the set of policies associated with the layout associated with the distributed virtual appliance includes one or more of the following: a condition for when a new compute unit is to be added, a condition for when a compute unit is to be removed, bandwidth properties, throughput properties, latency properties, reliability characteristics properties, a number of data plane compute units to be allocated for the distributed virtual appliance, and a number of data planes dispatcher compute units to manage the allocated data plane compute units.

22. A computer program product for a distributed virtual appliance, the computer program product being embodied in a non-transitory computer readable medium and comprising computer instructions for:
 implementing the distributed virtual appliance to perform a network service, wherein the distributed virtual application comprises a plurality of compute units to operate together to implement the network service, wherein the plurality of compute units associated with the distributed virtual appliance is provisioned by a management tool, wherein implementing the distributed virtual appliance to perform the network service comprises:
  configuring a first set of the plurality of compute units as a set of data planes dispatcher compute units, wherein a data planes dispatcher compute unit is configured to:
   receive a packet associated with a network traffic flow via a network interface associated with the distributed virtual appliance; and
   distribute the packet associated with the network traffic flow to a data plane compute unit of a set of data plane compute units of the plurality of compute units;
  configuring a second set of the plurality of compute units as a set of data planes manager compute units, wherein a data planes manager compute unit is configured to:
   receive a set of configuration information from the management tool, wherein the set of configuration information describes the network service to be performed by the distributed virtual appliance; and
   send at least a portion of the set of configuration information associated with a data plane compute unit role to the data plane compute unit;
  configuring a third set of the plurality of compute units as the set of data plane compute units, wherein the data plane compute unit is configured to:
   receive the at least portion of the set of configuration information associated with the data plane compute unit role from the data planes manager compute unit;
   receive the packet associated with the network traffic flow from the data planes dispatcher compute unit; and
   process the packet associated with the network traffic flow based at least in part on the at least portion of the set of configuration information associated with the data plane compute unit role; and
 dynamically adding or removing, by the management tool, one or more data plane compute units implementing the network service without disruption to network traffic associated with the distributed virtual appliance based at least in part on a set of policies associated with a layout associated with the distributed virtual appliance.

23. A method for a distributed virtual appliance, comprising:
 implementing the distributed virtual appliance to perform a network service, wherein the distributed virtual application comprises a plurality of compute units to operate together to implement the network service, wherein the plurality of compute units associated with the distributed virtual appliance is provisioned by a management tool, wherein each compute unit is implemented using a virtual machine executed on a computer, wherein implementing the distributed virtual appliance to perform the network service comprises:
  configuring a first set of the plurality of compute units as a set of data planes dispatcher compute units, wherein a data planes dispatcher compute unit is configured to:
   receive a packet associated with a network traffic flow via a network interface associated with the distributed virtual appliance; and
   distribute the packet associated with the network traffic flow to a data plane compute unit of a set of data plane compute units of the plurality of compute units;
  configuring a second set of the plurality of compute units as a set of data planes manager compute units, wherein a data planes manager compute unit is configured to:
   receive a set of configuration information from the management tool, wherein the set of configuration information describes the network service to be
performed by the distributed virtual appliance; and
send at least a portion of the set of configuration
information associated with a data plane compute
unit role to the data plane compute unit;
configuring a third set of the plurality of compute units
as the set of data plane compute units, wherein the
data plane compute unit is configured to:
receive the at least portion of the set of configuration
information associated with the data plane compute unit role from the data planes manager compute unit;
receive the packet associated with the network traffic
flow from the data planes dispatcher compute unit; and
process the packet associated with the network traffic
flow based at least in part on the at least portion of
the set of configuration information associated
with the data plane compute unit role; and
adding, by a management tool, a new compute unit to the
distributed virtual appliance based at least in part on a set
of policies associated with a layout associated with the
distributed virtual appliance, wherein the new compute
unit is automatically self-configured for implementing
the network service upon being added to the distributed
virtual appliance, wherein the new compute unit is
assigned a role within the distributed virtual appliance,
wherein the new compute unit is configured to receive at
least a portion of a set of configuration information
associated with the distributed virtual appliance from
the data planes manager compute unit, wherein the at
least the portion of the set of configuration information
received by the new compute unit is determined based at
least in part on the role assigned to the new compute unit.

24. The method of claim 23, wherein the new compute unit is defined with the role prior to being added to the distributed virtual appliance.

25. The method of claim 23, wherein the at least portion of the set of configuration information associated with the distributed virtual appliance comprises a software image associated with the distributed virtual appliance and wherein the new compute unit is configured to run the software image.

26. The method of claim 23, further comprising using the data planes manager compute unit to send the at least portion of the set of configuration information to the new compute unit.

27. A distributed virtual appliance system, comprising:
a processor configured to:
implement the distributed virtual appliance to perform a
network service, wherein the distributed virtual application comprises a plurality of compute units to operate together to implement the network service,
wherein the plurality of compute units associated with
the distributed virtual appliance is provisioned by a
management tool, wherein each compute unit is
implemented using a virtual machine executed on a
computer, wherein to implement the distributed virtual appliance to perform the network service comprises to:
configure a first set of the plurality of compute units as
a set of data planes dispatcher compute units,
wherein a data planes dispatcher compute unit is
configured to:
receive a packet associated with a network traffic
flow via a network interface associated with the
distributed virtual appliance; and
distribute the packet associated with the network
traffic flow to a data plane compute unit of a set
of data plane compute units of the plurality of
compute units;
configure a second set of the plurality of compute
units as a set of data planes manager compute units,
wherein a data planes manager compute unit is
configured to:
receive a set of configuration information from the
management tool, wherein the set of configuration information describes the network service to
be performed by the distributed virtual appliance; and
send at least a portion of the set of configuration
information associated with a data plane compute unit role to the data plane compute unit;
configure a third set of the plurality of compute units
as the set of data plane compute units, wherein the
data plane compute unit is configured to:
receive the at least portion of the set of configuration information associated with the data plane
compute unit role from the data planes manager
compute unit;
receive the packet associated with the network traffic flow from the data planes dispatcher compute
unit; and
process the packet associated with the network traffic flow based at least in part on the at least
portion of the set of configuration information
associated with the data plane compute unit role;
and
add, by a management tool, a new compute unit to the
distributed virtual appliance based at least in part on a
set of policies associated with a layout associated with
the distributed virtual appliance, wherein the new
compute unit is automatically self-configured for
implementing the network service upon being added
to the distributed virtual appliance, wherein the new
compute unit is assigned a role within the distributed
virtual appliance, wherein the new compute unit is
configured to receive at least a portion of a set of
configuration information associated with the distributed virtual appliance from the data planes manager
compute unit, wherein the at least the portion of the
set of configuration information received by the new
compute unit is determined based at least in part on
the role assigned to the new compute unit; and
a memory coupled to the processor and configured to provide the processor with instructions.

28. The system of claim 27, wherein the new compute unit is defined with the role prior to being added to the distributed virtual appliance.

29. The system of claim 27, wherein the at least portion of the set of configuration information associated with the distributed virtual appliance comprises a software image associated with the distributed virtual appliance and wherein the new compute unit is configured to run the software image.

30. The system of claim 27, wherein the processor is further configured to use the data planes manager compute unit to send the at least portion of the set of configuration information to the new compute unit.

31. A computer program product for a distributed virtual appliance, the computer program product being embodied in a non-transitory computer readable medium and comprising computer instructions for:
implementing the distributed virtual appliance to perform a
network service, wherein the distributed virtual application tion comprises a plurality of compute units to operate together to implement the network service, wherein the plurality of compute units associated with the distributed virtual appliance is provisioned by a management tool, wherein each compute unit is implemented using a virtual machine executed on a computer, wherein implementing the distributed virtual appliance to perform the network service comprises:

configuring a first set of the plurality of compute units as a set of data planes dispatcher compute units, wherein a data planes dispatcher compute unit is configured to:
  receive a packet associated with a network traffic flow via a network interface associated with the distributed virtual appliance; and
  distribute the packet associated with the network traffic flow to a data plane compute unit of a set of data plane compute units of the plurality of compute units;

configuring a second set of the plurality of compute units as a set of data planes manager compute units, wherein a data planes manager compute unit is configured to:
  receive a set of configuration information from the management tool, wherein the set of configuration information describes the network service to be performed by the distributed virtual appliance; and
  send at least a portion of the set of configuration information associated with a data plane compute unit role to the data plane compute unit;

configuring a third set of the plurality of compute units as the set of data plane compute units, wherein the data plane compute unit is configured to:
  receive the at least portion of the set of configuration information associated with the data plane compute unit role from the data planes manager compute unit;
  receive the packet associated with the network traffic flow from the data planes dispatcher compute unit; and
  process the packet associated with the network traffic flow based at least in part on the at least portion of the set of configuration information associated with the data plane compute unit role; and adding, by a management tool, a new compute unit to the distributed virtual appliance based at least in part on a set of policies associated with a layout associated with the distributed virtual appliance, wherein the new compute unit is automatically self-configured for implementing the network service upon being added to the distributed virtual appliance, wherein the new compute unit is assigned a role within the distributed virtual appliance, wherein the new compute unit is configured to receive at least a portion of a set of configuration information associated with the distributed virtual appliance from the data planes manager compute unit, wherein the at least the portion of the set of configuration information received by the new compute unit is determined based at least in part on the role assigned to the new compute unit.

* * * * *